US010720645B2

(12) United States Patent
Yamada et al.

(10) Patent No.: US 10,720,645 B2
(45) Date of Patent: Jul. 21, 2020

(54) CARBON MATERIAL FOR NON-AQUEOUS ELECTROLYTE SECONDARY BATTERY, NEGATIVE ELECTRODE FOR NON-AQUEOUS ELECTROLYTE SECONDARY BATTERY, NON-AQUEOUS ELECTROLYTE SECONDARY BATTERY, AND MANUFACTURING METHOD FOR CARBON MATERIAL FOR NON-AQUEOUS ELECTROLYTE SECONDARY BATTERY

(71) Applicant: MITSUBISHI CHEMICAL CORPORATION, Tokyo (JP)

(72) Inventors: Shunsuke Yamada, Ibaraki (JP); Nobuyuki Ishiwatari, Ibaraki (JP); Akio Ueda, Ibaraki (JP); Tooru Fuse, Kagawa (JP); Masakazu Yokomizo, Kagawa (JP); Akihiro Katou, Kagawa (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 744 days.

(21) Appl. No.: 14/628,370

(22) Filed: Feb. 23, 2015

(65) Prior Publication Data
US 2015/0243989 A1 Aug. 27, 2015

Related U.S. Application Data

(63) Continuation of application No. PCT/JP2013/072472, filed on Aug. 22, 2013.

(30) Foreign Application Priority Data

Aug. 23, 2012 (JP) ................................ 2012-184082

(51) Int. Cl.
H01M 4/58 (2010.01)
H01M 4/04 (2006.01)
H01M 4/36 (2006.01)
H01M 10/05 (2010.01)
H01M 4/587 (2010.01)
H01M 10/0525 (2010.01)
H01M 10/052 (2010.01)
H01M 4/1393 (2010.01)
H01M 4/02 (2006.01)

(52) U.S. Cl.
CPC ......... H01M 4/587 (2013.01); H01M 4/0416 (2013.01); H01M 4/364 (2013.01); H01M 4/366 (2013.01); H01M 10/0525 (2013.01); H01M 4/0471 (2013.01); H01M 4/1393 (2013.01); H01M 10/052 (2013.01); H01M 2004/027 (2013.01); H01M 2220/20 (2013.01)

(58) Field of Classification Search
CPC .... H01M 4/587; H01M 10/0525; H01M 4/04; H01M 4/36; H01M 4/364; H01M 4/0416; H01M 10/052; H01M 4/1393
See application file for complete search history.

(56) References Cited

U.S. PATENT DOCUMENTS

| 8,647,776 | B2 | 2/2014 | Yamada et al. | |
|---|---|---|---|---|
| 8,936,876 | B2 | 1/2015 | Yamada et al. | |
| 2005/0266314 | A1 | 12/2005 | Sheem et al. | |
| 2007/0178382 | A1 | 8/2007 | Kim et al. | |
| 2009/0004569 | A1* | 1/2009 | Yamamoto ............ | H01M 4/133 429/231.8 |
| 2009/0269669 | A1 | 10/2009 | Kim et al. | |
| 2009/0311599 | A1 | 12/2009 | Kawai et al. | |
| 2010/0021820 | A1 | 1/2010 | Ishii | |
| 2010/0273050 | A1 | 10/2010 | Sheem et al. | |
| 2011/0262802 | A1* | 10/2011 | Uono .................... | B82Y 30/00 429/188 |
| 2012/0021294 | A1 | 1/2012 | Zhamu et al. | |
| 2012/0094175 | A1 | 4/2012 | Sheem et al. | |

FOREIGN PATENT DOCUMENTS

| CN | 101371383 A | 2/2009 | |
|---|---|---|---|
| CN | 102203989 A | 9/2011 | |
| EP | 1 981 104 A1 | 10/2008 | |
| EP | 1981104 A1 * | 10/2008 | .............. H01M 4/58 |
| JP | 7-307165 A | 11/1995 | |
| JP | 11-31508 A | 2/1999 | |
| JP | 2004-63321 A | 2/2004 | |
| JP | 2005-243447 A | 9/2005 | |

(Continued)

OTHER PUBLICATIONS

Extended European Search Report dated Jul. 8, 2015 in Patent Application No. 13830413.4.
Combined Chinese Office Action and Search Report dated Jun. 3, 2016 in Patent Application No. 201380044185.X (with English Translation).
Japanese Office Action dated Aug. 1, 2017 in Japanese Patent Application No. 2013-172731 (with unedited computer generated English translation).
International Search Report dated Dec. 10, 2013 in PCT/JP2013/072472 (with English language translation).
International Preliminary Report on Patentability and Written Opinion dated Mar. 5, 2015 in PCT/JP2013/072472 (submitting English language translation only).

(Continued)

Primary Examiner — Jonathan Crepeau
Assistant Examiner — Angela J Martin
(74) Attorney, Agent, or Firm — Oblon, McClelland, Maier & Neustadt, L.L.P.

(57) ABSTRACT

An objet of the invention is to provide a non-aqueous electrolyte secondary battery superior in input-output characteristics even at a low temperature. To achieve the object, hybrid particles (carbon material) satisfying certain conditions, and composed of graphite particles and carbon particles with a primary particle size from 3 nm to 500 nm, preferably as well as amorphous carbon, are used as a negative electrode active material for a non-aqueous electrolyte secondary battery, so that the input-output characteristics of a non-aqueous electrolyte secondary battery at a low temperature can be improved remarkably.

10 Claims, No Drawings

(56) References Cited

FOREIGN PATENT DOCUMENTS

| | | | |
|---|---|---|---|
| JP | 2005-302725 A | 10/2005 |
| JP | 2007-200868 A | 8/2007 |
| JP | 2008-27664 A | 2/2008 |
| JP | 2008-186732 A | 8/2008 |
| JP | 2008-277155 A | 11/2008 |
| JP | 2009-4304 A | 1/2009 |
| JP | 2009-266795 A | 11/2009 |
| JP | 2010-218758 A | 9/2010 |
| JP | 2011-253688 A | 12/2011 |
| JP | 2012-004142 A | 1/2012 |
| JP | 2012-43546 A | 3/2012 |
| JP | 2012-074297 A | 4/2012 |
| JP | 2013-506233 A | 2/2013 |
| KR | 10-2008-0087823 A | 10/2008 |
| WO | WO 2007/086603 A1 | 8/2007 |
| WO | WO 2008/010312 A | 1/2008 |
| WO | WO 2008-056820 A1 | 5/2008 |
| WO | WO 2012/000201 A1 | 1/2012 |
| WO | WO 2012/015054 A1 | 2/2012 |

OTHER PUBLICATIONS

Japanese Office Action dated Oct. 16, 2018 in Japanese Patent Application No. 2017-231208 (with unedited computer generated English translation), citing documents AO and AP therein, 5 pages.

Decision of Refusal dated Mar. 26, 2019 in Japanese Patent Application No. 2017-231208 with machine generated English translation.

Office Action (Notification of Reason for Refusal) issued Oct. 14, 2019 in Korean Patent Application No. 10-2015-7005447 filed Aug. 22, 2013 with machine-generated English translation retrieved from the EPO Global Dossier, 10 pages.

Office Action dated Mar. 31, 2020 of the corresponding Japanese Patent Application No. 2019-117038 with computer-generated English translation citing documents AO-AR, 11 pages.

\* cited by examiner

CARBON MATERIAL FOR NON-AQUEOUS ELECTROLYTE SECONDARY BATTERY, NEGATIVE ELECTRODE FOR NON-AQUEOUS ELECTROLYTE SECONDARY BATTERY, NON-AQUEOUS ELECTROLYTE SECONDARY BATTERY, AND MANUFACTURING METHOD FOR CARBON MATERIAL FOR NON-AQUEOUS ELECTROLYTE SECONDARY BATTERY

TECHNICAL FIELD

The present invention relates to a carbon material for a non-aqueous electrolyte secondary battery, a negative electrode for a non-aqueous electrolyte secondary battery, a non-aqueous electrolyte secondary battery, and a production method for a carbon material for a non-aqueous electrolyte secondary battery.

This is a continuation of International Application PCT/JP2013/072472, filed on Aug. 22, 2013, and designated the U.S., (and claims priority from Japanese Patent Application 2012-184082 which was filed on Aug. 23, 2012) the entire contents of which are incorporated herein by reference.

BACKGROUND ART

In step with the progress in downsizing and performance-upgrading of electronic devices, a demand for a high capacity secondary battery has been growing further. Especially, a non-aqueous electrolyte secondary battery such as a lithium ion secondary battery which exhibits a higher energy density compared to a nickel-hydrogen battery, etc., has been drawing attention.

Although a lithium secondary battery using metallic lithium as a negative electrode material has been heretofore widely known as a typical non-aqueous electrolyte secondary battery, the same has a drawback in terms of cycle performance or safety due to deposit of dendrite-shaped lithium during battery charging. Consequently, a lithium ion secondary battery using a carbon material as a negative electrode material has been investigated especially seriously. Graphite is known as a typical carbon material, and it has been reported with respect to a lithium ion secondary battery using graphite that the electrode expansion is small and the cycle performance is superior. However, when only graphite is used as a negative electrode material, there appears a drawback that the irreversible capacity is large or the rate characteristics are inferior, and for eliminating the same an investigation on a negative electrode material combining graphite and a carbon material with low crystallinity (low degree of graphitization) has been progressed.

For example, "a hybrid graphite particle composed of granulated graphite formed by aggregating a plurality of graphite scales, and a carbonaceous layer and carbonaceous fine particles having lower crystallinity than the granulated graphite filled in internal voids and/or coated on outer surfaces of the granulated graphite, as well as a negative electrode for a lithium ion secondary battery using the same" has been proposed (refer to Patent Document 1).

Further, "a negative electrode material for a secondary battery containing: a negative electrode active material made of natural graphite; and a covering material coated with a mixture of pitch as a low crystallinity carbon material and an electroconductive material on a surface of the negative electrode active material" has been proposed (refer to Patent Document 2).

Further, "a lithium ion secondary battery material for a negative electrode composed of graphite powder particles, and hybrid particles of carbon black and carbonized pitch and having an average particle size $D_{50}$ of 8 to 15 μm and a specific surface area of 15 m$^2$/g or less" has been proposed (refer to Patent Document 3).

Furthermore, "a negative electrode active material for a lithium ion secondary battery composed of a powdery carbon material having a multiple-phase structure, which is a mixture of nearly spherical graphite particles having microspikes on a surface obtained by impregnating or coating a mixture of pitch and carbon black in/on a base material formed spherical from natural graphite, and being fired at 900° C. to 1500° C., and carbonaceous particles obtained by firing a mixture of pitch and carbon black at 900° C. to 1500° C., crushing the same, and followed by adjustment of the particle size; and has G band complex peaks near 1600 cm$^{-1}$ and near 1580 cm$^{-1}$, and at least one D band peak near 1380 cm$^{-1}$ in a Raman spectroscopic analysis using argon laser light with a wavelength of 514.5 nm, and a lattice spacing $d_{002}$ of crystal faces obtained through wide-angle X-ray diffraction from 0.335 to 0.337 nm" has been proposed (refer to Patent Document 4).

PRIOR ART DOCUMENT

Patent Documents

Patent Document 1: Japanese Patent Application Laid-Open No. 2004-063321
Patent Document 2: Japanese Patent Application Laid-Open No. 2007-200868
Patent Document 3: International Publication No. WO 2007/086603
Patent Document 4: Japanese Patent Application Laid-Open No. 2009-004304

DISCLOSURE OF THE INVENTION

Problems to be Solved by the Invention

For example, when a lithium ion secondary battery is used for a hybrid car or an electric car, large energy is required for starting and accelerating the car, and energy has to be efficiently recovered in decelerating and stopping, and therefore in addition to high charge and discharge capacity, safety, and durability demanded for a cell phone, or a notebook computer, very high input-output characteristic are required. Especially for a lithium ion secondary battery, which input-output characteristics tend to decrease at a low temperature, a technology which can maintain high input-output characteristics even at a low temperature is required.

According to investigations by the inventors, the inventions disclosed in Patent Document 3, and 4 could not satisfy input-output characteristics, initial efficiency, and discharge capacity with good balance at a low temperature, and a carbon material that could achieve a task of the present invention was hardly produced only from the disclosures thereof.

Namely, an object of the present invention is to provide a non-aqueous electrolyte secondary battery superior in input-output characteristics even at a low temperature, while various characteristics required for a lithium ion secondary battery are satisfied.

Means of Solving the Problems

The inventors diligently investigated for achieving the task to find that the input-output characteristics of a non-aqueous electrolyte secondary battery at a low temperature can be improved remarkably by using hybrid particles (carbon material) satisfying certain conditions, and composed of graphite particles and carbon fine particles with a primary particle size of 3 nm or more to 500 nm or less, as a negative electrode active material for a non-aqueous electrolyte secondary battery, thereby completing the present invention.

Namely, the present invention is as follows.

<1> A carbon material for a non-aqueous electrolyte secondary battery consisting of hybrid particles comprising graphite particles and carbon fine particles with a primary particle size of 3 nm or more and 500 nm or less, wherein microscopic Raman R values measured for 30 hybrid particles selected at random by a microscopic Raman spectroscopy apparatus give a Raman $R_{(90/10)}$ value expressed by the following formula 2 of 1 or more and 4.3 or less;

Raman $R_{(90/10)}$ value=(Microscopic Raman $R$ value of the particle whose microscopic Raman $R$ value is the (total number of measured particles×0.9)th smallest microscope Raman $R$ value in the case where the microscopic Raman $R$ values are arranged in an ascending order)/(Microscopic Raman $R$ value of the particle whose microscopic Raman $R$ value is the (total number of measured particles×0.1)th smallest microscope Raman $R$ value in the case where the microscopic Raman $R$ values are arranged in an ascending order). Formula 2:

<2> The carbon material for a non-aqueous electrolyte secondary battery according to <1> above, wherein the hybrid particles further comprise amorphous carbon.

<3> The carbon material for a non-aqueous electrolyte secondary battery according to <1> or <2> above, wherein the Raman R value of the hybrid particles is 0.35 or more and 1 or less.

<4> The carbon material for a non-aqueous electrolyte secondary battery according to any one of <1> to <3> above, wherein the BET specific surface area of the hybrid particles is 4.5 $m^2/g$ or more.

<5> The carbon material for a non-aqueous electrolyte secondary battery according to any one of <1> to <4> above, wherein the total pore volume of pores having a pore size of not larger than 200 nm as determined by a Hg porosimetry analysis is 0.04 mL/g or more.

<6> A negative electrode for a non-aqueous electrolyte secondary battery comprising a current collector and a negative electrode active material formed on the current collector, wherein the negative electrode active material is the carbon material for a non-aqueous electrolyte secondary battery according to any of <1> to <5> above.

<7> A non-aqueous electrolyte secondary battery comprising a positive electrode and a negative electrode, which are able to absorb and release a metal ion, and an electrolyte solution, wherein the negative electrode is the negative electrode for a non-aqueous electrolyte secondary battery according to <6> above.

<8> A production method for a carbon material for a non-aqueous electrolyte secondary battery comprising graphite particles, carbon fine particles with a primary particle size of 3 nm or more and 500 nm or less, and amorphous carbon comprising:

a step of coating the carbon fine particles on to the graphite particles by a dry method, and a step of mixing the graphite particles coated with the carbon fine particles obtained at the previous step and an organic precursor of the amorphous carbon, and then subjecting the mixture to a firing treatment.

<9> The production method for a carbon material for a non-aqueous electrolyte secondary battery according to <8> above, wherein the amount of oil absorption of the carbon fine particles is 330 mL/100 g or less.

Effects of the Invention

According to the present invention a non-aqueous electrolyte secondary battery superior in input-output characteristics even at a low temperature can be provided. Further, a negative electrode for a non-aqueous electrolyte secondary battery superior in peel strength can be provided.

MODE FOR CARRYING OUT THE INVENTION

A carbon material for a non-aqueous electrolyte secondary battery, a negative electrode for a non-aqueous electrolyte secondary battery, and a non-aqueous electrolyte secondary battery according to the present invention will be described in detail below, provided that the same are not limited to the description, insofar as the same are not inconsistent with the spirit of the present invention.

1. Carbon Material for Non-aqueous Electrolyte Secondary Battery

A carbon material for a non-aqueous electrolyte secondary battery according to the present invention (hereinafter occasionally abbreviated as a "carbon material according to the present invention") is "hybrid particles comprising graphite particles and carbon fine particles with a primary particle size of 3 nm or more and 500 nm or less (hereinafter occasionally abbreviated as "carbon fine particles")", wherein the hybrid particles (carbon material) satisfy the following condition concerning a Raman $R_{(90/10)}$ value.

Microscopic Raman R values measured for 30 hybrid particles selected at random by a microscopic Raman spectroscopy apparatus give a Raman $R_{(90/10)}$ value expressed by the following formula 2 of 1 or more and 4.3 or less.

Raman $R_{(90/10)}$ value=(Microscopic Raman $R$ value of the particle whose microscopic Raman $R$ value is the (total number of measured particles×0.9)th smallest microscope Raman $R$ value in the case where the microscopic Raman $R$ values are arranged in an ascending order)/(Microscopic Raman $R$ value of the particle whose microscopic Raman $R$ value is the (total number of measured particles×0.1)th smallest microscope Raman $R$ value in the case where the microscopic Raman $R$ values are arranged in an ascending order). Formula 2:

In other words, the inventors have discovered that the input-output characteristics of a non-aqueous electrolyte secondary battery at a low temperature can be improved remarkably to a level, which has been unattainable by a conventional technology, by using hybrid particles (carbon material) satisfying the Raman $R_{(90/10)}$ value requirement, and consisting of graphite particles and carbon fine particles with a primary particle size of 3 nm or more and 500 nm or less, as a negative electrode active material for a non-aqueous electrolyte secondary battery, because uniform and continuous fine flow channels are formed on a surface of the negative electrode active material and a Li ion can move smoothly even at a low temperature. Further, since there are microspikes forming the fine flow channels on a surface of a negative electrode active material, it has been found that the peel strength of the negative electrode is enhanced due to increase in the number of bonding points among particles.

Meanwhile, it is preferable that a carbon material according to the present invention further contains amorphous carbon.

"A carbon material for a non-aqueous electrolyte secondary battery" is herein a material used for a negative electrode of a non-aqueous electrolyte secondary battery such as a lithium ion secondary battery, and means a carbon material that exerts a function as a negative electrode active material adsorbing and releasing a lithium ion, or the like.

"A hybrid particle" includes "graphite particle(s)", and "carbon fine particle(s) with a primary particle size of 3 nm or more and 500 nm or less", preferably as well as "amorphous carbon" and means a particle that has united the solid components by physical and/or chemical bonds (adsorption) (hereinafter occasionally abbreviated as a "hybridization"). Therefore, in producing a carbon material according to the present invention, in the case where "graphite particles", "carbon fine particles with a primary particle size of 3 nm or more and 500 nm or less", and "amorphous carbon" form respectively individual particles, which are then mixed each other actively to form a mixture, the mixture does not fall within a carbon material according to the present invention.

Although there is no particular restriction on a specific form of a hybrid particle, insofar as a carbon material according to the present invention is "hybrid particles comprising graphite particles and carbon fine particles with a primary particle size of 3 nm or more and 500 nm or less", the same is preferably hybrid particles containing "carbon fine particles with a primary particle size of 3 nm or more and 500 nm or less, and amorphous carbon" as well as "graphite particles" as nuclei, and is preferably a multilayer structure carbon material, in which the surfaces of "graphite particles" are partly or entirely coated with "carbon fine particles with a primary particle size of 3 nm or more and 500 nm or less, and amorphous carbon".

The particle size (maximum diameter) of graphite particles as a multilayer structure carbon material, in which the surfaces of "graphite particles" are partly or entirely coated with "carbon fine particles with a primary particle size of 3 nm or more and 500 nm or less, and amorphous carbon", is ordinarily 0.1 μm or more, preferably 1 μm or more, and more preferably 2 μm or more; and ordinarily 50 μm or less, preferably 30 μm or less, more preferably 25 μm or less, and further preferably 20 μm or less.

The thickness of amorphous carbon as a multilayer structure carbon material, is ordinarily 0.1 nm or more, preferably 1 nm or more, and more preferably 3 nm or more; and ordinarily 3 μm or less, preferably 1 μm or less, more preferably 100 nm or less, and especially preferably 50 nm or less. In this regard, the particle size of graphite particles, and the thickness of amorphous carbon can be measured by observation with an electron microscope such as SEM and TEM. Presence of amorphous carbon can be recognized by examining existence or nonexistence, or the quantity by a Raman spectroscopy analysis or a measurement of real density, or the like.

Although there is no particular restriction on the contents of "graphite particles", "carbon fine particles with a primary particle size of 3 nm or more and 500 nm or less", and "amorphous carbon" in a carbon material according to the present invention, the content of "carbon fine particles with a primary particle size of 3 nm or more and 500 nm or less" with respect to 100 parts by mass of "graphite particles" is ordinarily 0.01 part by mass or more, preferably 0.1 part by mass or more, and more preferably 1 part by mass or more; and ordinarily 20 parts by mass or less, preferably 10 parts by mass or less, and more preferably 5 parts by mass or less.

Meanwhile, the content of "amorphous carbon" with respect to 100 parts by mass of "graphite particles" is ordinarily 0.01 part by mass or more, preferably 0.1 part by mass or more, and more preferably 0.5 part by mass or more; and ordinarily 20 parts by mass or less, preferably 10 parts by mass or less, and more preferably 5 parts by mass or less.

If the hybrid particles are in such a form, the Raman R(90/10) value requirement can be easily fulfilled, and when they are used as a negative electrode active material for a non-aqueous electrolyte secondary battery, the input-output characteristics of a non-aqueous electrolyte secondary battery at a low temperature can be remarkably improved.

The total pore volume of pores having a pore size of not larger than 200 nm as determined by a Hg porosimetry analysis (hereinafter also referred to as "micropore volume") of a carbon material according to the present invention is preferably 0.04 mL/g or more. The total pore volume is preferably 0.04 mL/g or more, more preferably 0.06 mL/g or more, and further preferably 0.08 mL/g or more; and ordinarily 1 mL/g or less, preferably 0.5 mL/g or less, and more preferably 0.3 mL/g or less. Within the range, there is an advantage that input-output characteristics can be high even at a low temperature, while various characteristics required for a lithium ion secondary battery, such as capacity and initial efficiency, are kept satisfied.

The "total pore volume" to be determined through a "Hg porosimetry analysis" according to the present invention is based on values measured with a Hg Porosimeter (AutoPore 9520, produced by Micromeritics Instrument Corporation) according to the following procedures.

1) A sample (carbon material) weighed out in an amount of approx. 0.2 g is placed in a powder cell, and then subjected to a pretreatment by deaerating at room temperature, in vacuum (50 μm-Hg or less) for 10 min.
2) The pressure is reduced to 4 psia (approx. 28 kPa) followed by introduction of mercury, whose pressure is increased step by step from 4 psia (approx. 28 kPa) to 40,000 psia (approx. 280 MPa), then reduced to 25 psia (approx. 170 kPa). The number of steps during pressure increase is 80 or more, and at each step an intruded amount of mercury is measured after an equilibrium time of 10 second.
3) The pore size distribution and the total pore volume are calculated from an obtained mercury intrusion curve using the Washburn equation. In this connection, the calculation is based on the mercury surface tension ($\gamma$) of 485 dyne/cm, and the mercury contact angle ($\varphi$) of 140°.

A carbon material according to the present invention is characterized in that, when microscopic Raman R values are measured as above for 30 hybrid particles selected at random by a microscopic Raman spectroscopy apparatus, the Raman $R_{(90/10)}$ value expressed by the following formula 2 is 1 or more and 4.3 or less.

Raman $R_{(90/10)}$ value=(Microscopic Raman $R$ value of the particle whose microscopic Raman $R$ value is the (total number of measured particles×0.9)th smallest microscope Raman $R$ value in the case where the microscopic Raman $R$ values are arranged in an ascending order)/ (Microscopic Raman $R$ value of the particle whose microscopic Raman $R$ value is the (total number of measured particles×0.1)th smallest microscope Raman $R$ value in the case where the microscopic Raman $R$ values are arranged in an ascending order). Formula 2:

Since there are microscopic Raman R values for 30 hybrid particles selected at random, the particle whose microscopic Raman R value is the (total number of measured particles×

0.9)th smallest microscopic Raman R values in the case where the microscopic Raman R values are arranged in an ascending order means a particle whose microscopic Raman R value is the 27th smallest, and the particle whose microscopic Raman R value is the (total number of measured particles×0.1)th smallest microscopic Raman R values in the case where the microscopic Raman R values are arranged in an ascending order means a particle whose microscopic Raman R value is the 3rd smallest.

The Raman $R_{(90/10)}$ value expressed by Formula 2 is preferably 1.01 or more, more preferably 1.1 or more, further preferably 1.2 or more, and especially preferably 1.5 or more; and preferably 4.3 or less, more preferably 4 or less, further preferably 3.5 or less, and especially preferably 3.2 or less. Within the range, there is an advantage that input-output characteristics can be high even at a low temperature, while various characteristics required for a lithium ion secondary battery, such as charge and discharge efficiency, and discharge capacity of the battery are kept satisfied.

When a Raman $R_{(90/10)}$ value is in the range, it indicates conceivably a state of a surface of a carbon material, for example, where the number of carbon fine particles existing as aggregates is small, and carbon fine particles are present dispersed uniformly over surfaces of graphite particles.

A value obtained by a microscopic Raman measurement using a Raman spectroscopy device (Nicolet Almega XR, manufactured by Thermo Fisher Scientific Inc.) under the following conditions is used as a Raman R value according to the present invention.

Particles as a measurement object are allowed to free-fall on a sample stage, the top surface of which is made flat, and the particles are subjected to a microscopic Raman measurement.

Excitation wavelength: 532 nm
Laser power on the sample: 1 mW or less
Resolution: 10 $cm^{-1}$
Irradiation diameter: 1 μmΦ
Measurement range: 400 $cm^{-1}$ to 4,000 $cm^{-1}$
Peak intensity measurement: Corrected based on a linear baseline in a range approx. from 1100 $cm^{-1}$ to 1750 $cm^{-1}$
Calculation method of Raman The peak intensity $I_A$ up to the peak R value: top of a peak $P_A$ near 1580 $cm^{-1}$ and the peak intensity $I_B$ up to the peak top of a peak $P_B$ near 1360 $cm^{-1}$ in a spectrum after correction based on the linear baseline are read and an R value ($I_B/I_A$) was calculated.

Although, insofar as a carbon material according to the present invention satisfies the requirement of a Raman $R_{(90/10)}$ value, there is no particular restriction on other physical properties, preferable ranges of volume-based average particle diameter, BET specific surface area, tapped density, and Raman R value will be mentioned below.

(Volume-Based Average Particle Diameter $D_{50}$)

The volume-based average particle diameter of a carbon material according to the present invention is ordinarily 0.1 μm or more, preferably 1 μm or more, and more preferably 2 μm or more; and ordinarily 50 μm or less, preferably 30 μm or less, more preferably 25 μm or less, and further preferably 20 μm or less. Below the range, the irreversible capacity becomes high, and capacity decrease or deterioration of cycle performance may be induced by the resistance increase because the particle size becomes too small, so that establishment of electroconductive paths between carbon material particles and electroconductive paths between a carbon material and a conductive additive becomes difficult. On the other hand, beyond the range, the input-output characteristics tend to deteriorate, and at the same time process troubles such as streaking may occur more frequently when an input-output pole plate is formed, or the film thickness may become uneven when the material is coated on to a current collector.

Meanwhile, as a volume-based average particle diameter, a value obtained by mixing an aqueous solution of a surfactant (approx. 1 mL) with a measurement object and measuring a volume-based average particle diameter (median diameter $D_{50}$) using ion exchange water as a dispersing medium with a laser diffraction particle size distribution analyzer (for example, LA-920, manufactured by Horiba, Ltd.) is used.

(BET Specific Surface Area)

The BET specific surface area of a carbon material according to the present invention is ordinarily 1 $m^2/g$ or more, preferably 2 $m^2/g$ or more, more preferably 3 $m^2/g$ or more, further preferably 4.5 $m^2/g$ or more, and especially preferably 5.1 $m^2/g$ or more. Although there is no particular restriction on the upper limit, the range is ordinarily 20 $m^2/g$ or less, preferably 15 $m^2/g$ or less, and more preferably 10 $m^2/g$ or less. Within the range, favorably the charge and discharge efficiency and the discharge capacity of a battery are high, the absorption and desorption speed of lithium is high during quick charge and discharge, and the rate characteristics are superior.

As a BET specific surface area, a value obtained with a surface area meter (Automated surface area measuring apparatus manufactured by Ohkura Riken Co. Ltd.) by pre-drying a sample in a nitrogen flow at 350° C. for 15 min, and conducting a nitrogen adsorption BET 1-point method according to a gas flow method using a mix gas of nitrogen and helium, in which the relative pressure of nitrogen is regulated precisely at 0.3 with respect to the atmospheric pressure, is used.

(Tapped Density)

The tapped density of a carbon material according to the present invention is ordinarily 0.1 $g/cm^3$ or more, preferably 0.5 $g/cm^3$ or more, more preferably 0.7 $g/cm^3$ or more, and further preferably 0.9 $g/cm^3$ or more; and ordinarily 2 $g/cm^3$ or less, preferably 1.8 $g/cm^3$ or less, more preferably 1.6 $g/cm^3$ or less, and further preferably 1.4 $g/cm^3$ or less. Below the range, the packing density of a negative electrode produced therewith is hardly made high, so that high capacity battery may not be obtained. On the other hand, beyond the range, interparticle voids in an electrode may become so little, that interparticle electrical conductivity cannot be secured and preferable battery characteristic may become hardly available.

For obtaining a value of tapped density, a sample is passed through a sieve with the opening of 300 μm, then dropped into a 20 $cm^3$ tapping cell full up to the top edge face, subjected to tapping with a stroke length of 10 mm 1000 times using a powder density meter (for example, Tap Denser, manufactured by Seishin Enterprise Co., Ltd.), and measured in terms of the then volume and the sample mass.

(Raman R Value)

The Raman R value expressed by the following Formula 1 of a carbon material according to the present invention is preferably 0.35 or more and 1 or less.

Raman R value=(Intensity $I_B$ of peak $P_B$ near 1360 $cm^{-1}$ in Raman spectroscopy)/(Intensity $I_A$ of peak $P_A$ near 1580 $cm^{-1}$)   Formula 1:

The Raman R value is more preferably 0.40 or more, further preferably 0.45 or more, and especially preferably 0.48 or more; and more preferably 0.8 or less, and further preferably 0.6 or less. Below the range, the crystallinity of a particle surface may become too high and, when densification is conducted, crystals tend to align parallel to an electrode plate, which may invoke deterioration of the input-output characteristics. Meanwhile, beyond the range, crystals on a particle surface are disordered to increase the reactivity with an electrolyte solution, and decrease in the charge and discharge efficiency, or increase in gas generation may be invoked.

(Production Method)

Insofar as a carbon material according to the present invention is "hybrid particles comprising graphite particles and carbon fine particles with a primary particle size of 3 nm or more and 500 nm or less" and is hybrid particles (carbon material) satisfying the requirement of a Raman $R_{(90/10)}$ value, there is no particular restriction on a production method therefor. To satisfy the requirement of a Raman $R_{(90/10)}$ value, a production method, which takes the following (1) and (2) into consideration, should be preferably adopted.

(1) Carbon fine particles are coated on to graphite particles in a state of primary particles before the carbon fine particles are aggregated.

When carbon fine particles are disintegrated in advance singly, they form secondary particles when they are mixed with graphite particles. Therefore it is preferable to adopt such a production method, so that carbon fine particles are coated on graphite particles in a state where carbon fine particles are not aggregated, and uniform and continuous fine flow channels are easily formed on surfaces of graphite particles.

For coating carbon fine particles on to graphite particles in a state of primary particles before the carbon fine particles are aggregated, a so-called crusher mixer, which is an apparatus provided not only with a mixing and stirring mechanism for mixing and stirring "graphite particles" and "carbon fine particles", but also with a crushing mechanism for disintegrating "graphite particles" and "carbon fine particles", is preferably adopted for mixing as an apparatus for mixing "graphite particles" and "carbon fine particles".

By mixing "graphite particles" and "carbon fine particles" with such a crusher mixer, aggregates of "graphite particles" and "carbon fine particles" can be disintegrated and mixed uniformly. By disintegrating thoroughly aggregates of "graphite particles" and "carbon fine particles" and mixing the same uniformly before hybridization, any mutual aggregation of "carbon fine particles" at a subsequent step can be suppressed.

(2) As the carbon fine particles, carbon fine particles with low oil absorption are used. When carbon fine particles with low oil absorption are used, carbon fine particles are hardly aggregated to form secondary particles, when the same are mixed with amorphous carbon. Therefore, uniform dispersion of carbon fine particles can be easily and favorably achieved.

An example of a production method taking into consideration the above (1) and (2), is a production method including a step of coating carbon fine particles on to graphite particles by a dry method, and a step of mixing the graphite particles coated with the carbon fine particles obtained at the previous step and an organic precursor of amorphous carbon, and then subjecting the mixture to a firing treatment.

Examples of a step of coating carbon fine particles on to graphite particles by a dry method include a method of dry-blending carbon fine particles and graphite particles with a crusher mixer as described above. By the step, primary particles of carbon fine particles can be coated on graphite particles.

After primary particles of carbon fine particles are coated on graphite particles, an organic precursor of amorphous carbon is mixed and the mixture is fired. The firing temperature is preferably 2,600° C. or less, which will be describe in more detail below.

As the carbon fine particles, carbon fine particles with low oil absorption should preferably be used, and the amount of oil absorption of the carbon fine particles is preferably 330 mL/100 g or less, more preferably 170 mL/100 g or less, and further preferably 100 mL/100 g or less.

Whether carbon fine particles are dispersed uniformly can be determined by a Hg porosimetry analysis described above. Specifically, it is preferable that the rate of increase in volume of micropores having a pore size of 200 nm or less determined through a Hg porosimetry owing to coating of the carbon fine particles on the graphite particles is 50% or more. It is more preferably 100% or more, and further preferably 200% or more.

As a measuring method through Hg porosimetry, the method described above may be applied. A measurement of the volume increase rate of micropores may be carried out by measuring the respective volumes of micropores having a size of 200 nm or less of a carbon material produced with carbon fine particles and a carbon material produced without carbon fine particles, when a carbon material is produced, and calculating the increase rates thereof.

"Graphite particles (source material)" to be used for producing a carbon material according to the present invention should preferably have the following physical properties. Further, a graphite particle in a carbon material according to the present invention should have the same physical properties as the graphite particles (source material), unless there is any particular restriction.

There is no particular restriction on the crystallinity (graphitization degree) of a graphite particle in terms of the type or physical properties, insofar as the graphite particle is a carbon particle with relatively high crystallinity. That is to say, it should specifically be a carbon particle, in which the lattice spacing of (002) plane (d002) by a wide-angle X-ray diffraction method is not less than 0.335 nm and less than 0.340 nm. The value of d002 is preferably 0.338 nm or less, more preferably 0.337 nm or less, and further preferably 0.336 nm or less.

There is no particular restriction on the shape of "graphite particles (source material)", and it may be any of particulate, spherical, open-chain, acicular, fibrous, platy, squamous, and the like, however from a viewpoint of packing property a spherical form (spheroidized graphite) is especially preferable (spheroidization will be described below).

Also there is no particular restriction on the volume-based average particle diameter ($D_{50}$) of "graphite particles (source material)", and it is ordinarily 1 μm or more, preferably 3 μm or more, and more preferably 5 μm or more; and ordinarily 100 μm or less, preferably 50 μm or less, and more preferably 40 μm or less.

Further, there is no particular restriction on the BET specific surface area of "graphite particles (source material)", and it is in a range of ordinarily 1 m²/g or more, preferably 1.5 m²/g or more, more preferably 2 m²/g or more, further preferably 3 m²/g or more, especially preferably 4.5 m²/g or more, and most preferably 5.1 m²/g or more; and ordinarily 20 m²/g or less, preferably 15 m²/g or less, and more preferably 10 m²/g.

Further, there is no particular restriction on the tapped density of "graphite particles (source material)", and it is ordinarily 0.1 g/cm³ or more, preferably 0.5 g/cm³ or more, and more preferably 0.7 g/cm³ or more; and ordinarily 2 g/cm³ or less, preferably 1.8 g/cm³ or less, and more preferably 1.6 g/cm³ or less.

Further, there is no particular restriction on the Raman R value expressed by the following Formula 1 of "graphite particles (source material)", and it is preferably 0.35 or more and 1 or less.

Raman $R$ value=(Intensity $I_B$ of peak $P_B$ near 1360 cm⁻¹ in Raman spectroscopy)/(Intensity $I_A$ of peak $P_A$ near 1580 cm⁻¹)                                      Formula 1:

The Raman R value is more preferably 0.40 or more, further preferably 0.45 or more, and especially preferably 0.48 or more; and more preferably 0.8 or less, and further preferably 0.6 or less.

Also there is no particular restriction on the type of "graphite particles (source material)", and it may be either of natural graphite, and artificial graphite. As natural graphite, it may be any of squamous graphite, massive graphite, earthy graphite, and the like and graphite with little impurity is preferable, while it is preferable that a publicly known purification treatment is conducted according to need. Examples of artificial graphite include those having graphitized, by firing at a temperature in a range of ordinarily 2500° C. or higher, and ordinarily 3200° C. or lower, an organic substance, such as coal tar pitch, coal-derived heavy oil, atmospheric residual oil, petroleum heavy oil, an aromatic hydrocarbon, a nitrogen-containing cyclic compound, a sulfur-containing cyclic compound, polyphenylene, poly (vinyl chloride), poly(vinyl alcohol), polyacrylonitrile, poly (vinyl butyral), a natural polymer, polyphenylenesulfide, poly(phenylene oxide), a furfuryl alcohol resin, a phenol-formaldehyde resin, and an imide resin. In this case, a silicon-containing compound, a boron-containing compound, or the like may be used as a graphitization catalyst.

As described above, "graphite particles (source material)" should preferably have a spherical shape, and as for a method for spheroidizing a graphite particle, a spheroidized graphite particle can be produced by performing a spheroidizing treatment according to a well known technology. For example, it can be performed using an apparatus, which repeatedly gives particles mechanical actions, such as compression, friction, and shear force, mainly based on an impulsive force but including also an interactive action of particles. Specifically, preferable is an apparatus, in which there is a rotor provided with a large number of blades inside a casing, and the rotor rotates at a high speed to give a carbon material introduced inside mechanical actions, such as impulsive compression, friction, and shear force, for performing a surface treatment. An apparatus with a mechanism for giving mechanical actions repeatedly by circulating graphite particles is preferable. Examples of a specific apparatus include Nara Hybridization System (manufactured by Nara Machinery Co., Ltd.), Kryptron (manufactured by Earthtechnica Co., Ltd.), CF Mill (manufactured by Ube Industries, Ltd.), Mechanofusion System (manufactured by Hosokawa Micron Corporation), and Theta Composer (manufactured by Tokuju Corporation). Among them Nara Hybridization System (manufactured by Nara Machinery Co., Ltd.) is preferable. For example, a treatment is conducted with any of the above apparatus, there is ordinarily no particular restriction on the circumferential velocity of a rotating rotor, and it is preferably from 30 to 100 m/sec, more preferably 40 to 100 m/sec, and further preferably 50 to 100 m/sec. Although a treatment by a single pass of a carbonaceous substance is possible, it is preferable to circulate or retain the same inside the apparatus for 30 sec or more, and more preferable to circulate or retain the same inside the apparatus for 1 min or more.

With respect to "carbon fine particles (source material)" with a primary particle size of 3 nm or more and 500 nm or less (hereinafter occasionally "carbon fine particles (source material)")" to be used for producing a carbon material according to the present invention, insofar as the primary particle size is 3 nm or more and 500 nm or less, there is no particular restriction on the type and other physical properties, and the primary particle size is preferably 3 nm or more, and more preferably 15 nm or more; and preferably 500 nm or less, more preferably 200 nm or less, further preferably 100 nm or less, especially preferably 70 nm or less, and most preferably 30 nm or less. The primary particle size of carbon fine particles can be measured by observation with an electron microscope such as SEM, or by a laser diffraction particle size distribution analyzer.

There is no particular restriction on the shape of "carbon fine particles (source material)", and it may be any of particulate, spherical, open-chain, acicular, fibrous, platy, squamous, and the like.

Also, there is also no particular restriction on the BET specific surface area of "carbon fine particles (source material)", and it is in a range of ordinarily 1 m²/g or more, preferably 10 m²/g or more, and more preferably 30 m²/g or more; and ordinarily 1000 m²/g or less, preferably 500 m²/g or less, more preferably 120 m²/g or less, further preferably 100 m²/g or less, and especially preferably 70 m²/g or less.

There is also no particular restriction on the bulk density of "carbon fine particles (source material)", and it is ordinarily 0.01 g/cm³ or more, preferably 0.1 g/cm³ or more, more preferably 0.15 g/cm³ or more, and further preferably 0.17 g/cm³ or more; and ordinarily 1 g/cm³ or less, preferably 0.8 g/cm³ or less, and more preferably 0.6 g/cm³ or less.

There is also no particular restriction on the tapped density of "carbon fine particles (source material)", and it is ordinarily 0.1 g/cm³ or more, preferably 0.15 g/cm³ or more, and more preferably 0.2 g/cm³ or more; and ordinarily 2 g/cm³ or less, preferably 1 g/cm³ or less, and more preferably 0.8 g/cm³ or less.

As described above, the DBP oil absorption amount of "carbon fine particles (source material)" is preferably low. The oil absorption amount of carbon fine particles is preferably 330 mL/100 g or less, more preferably 170 mL/100 g or less, and further preferably 100 mL/100 g or less. Although there is no particular restriction on the lower limit, it is ordinarily 10 mL/100 g or more, preferably 50 mL/100 g or more, and more preferably 60 mL/100 g or more.

Also, there is no particular restriction on the type of "carbon fine particles (source material)", and examples thereof include fine powder coal, gas phase carbonization powder, carbon black, Ketjen black, and carbon nano-fiber. Among them, carbon black is especially preferable. In the case of carbon black, there are advantages that input-output characteristics can be excellent even at low temperature and at the same time it can be available inexpensively and easily.

A carbon material according to the present invention contains preferably amorphous carbon. In the case where amorphous carbon is used, there is no particular restriction on a precursor of amorphous carbon (source material for amorphous carbon) to be used for producing a carbon material, and examples thereof are organic substances including a coal-derived heavy oil, such as coal tar pitch, and a pyrolytic liquefaction oil; a straight heavy oil, such as an atmospheric residual oil, and a vacuum residual oil; a petroleum heavy oil, such as a cracked heavy oil, including ethylene tar, by-produced during thermal cracking of crude oil, naphtha, and the like; an aromatic hydrocarbon, such as acenaphthylene, decacyclene, and anthracene; a nitrogen-containing cyclic compound, such as phenazine and acridine; a sulfur-containing cyclic compound, such as thiophene; an aliphatic cyclic compound, such as adamantane; polyphenylene, such as biphenyl, and terphenyl; and a thermoplastic polymer, such as poly(vinyl chloride), poly(vinyl acetate), a poly(vinyl ester) including poly(vinyl butyral), and poly(vinyl alcohol).

When "graphite particles" and "carbon fine particles" are mixed, the mixing ratio of "graphite particles" to "carbon fine particles" should be selected appropriately based on the composition of a targeted hybrid particle, and with respect to 100 parts by mass of "graphite particles" "carbon fine particles" is ordinarily 0.01 part by mass or more, preferably 0.1 part by mass or more, and more preferably 0.15 part by mass or more; and ordinarily 20 parts by mass or less, preferably 10 parts by mass or less, more preferably 5 parts by mass or less, and further preferably 2.9 parts by mass or less. Within the range, there is an advantage that input-output characteristics are favorable even at a low temperature, while various characteristic required for a lithium ion secondary battery such as the charge and discharge efficiency and discharge capacity of a battery are satisfied.

When a precursor of amorphous carbon is mixed with "graphite particles" and "carbon fine particles", the mixing ratio of the precursor of amorphous carbon should be selected appropriately based on the composition of a targeted hybrid particle, and with respect to 100 parts by mass of "graphite particles", the precursor of amorphous carbon is in terms of carbon residue ordinarily 0.01 part by mass or more, preferably 0.1 part by mass or more, more preferably 0.5 part by mass or more, and further preferably 1 part by mass or more; and ordinarily 60 parts by mass or less, preferably 30 parts by mass or less, more preferably 20 parts by mass or less, further preferably 10 parts by mass or less, and especially preferably 5 parts by mass or less. Within the range, there is an advantage that the charge and discharge efficiency, discharge capacity, and input-output characteristics at a low temperature of a battery can be favorable.

When a precursor of amorphous carbon is mixed with a mixed powder of "graphite particles" and "carbon fine particles" and heat-treated in an inert gas, there is no particular restriction on the heat treatment conditions, and the heat treatment temperature is ordinarily 600° C. or more, preferably 800° C. or more, more preferably 900° C. or more, and further preferably 1000° C. or more; and ordinarily 2600° C. or less, preferably 2200° C. or less, more preferably 1800° C. or less, and further preferably 1500° C. or less. The heat treatment time is ordinarily 10 min to 24 hours, and heat treatment may be done up to a precursor of amorphous carbon is carbonized to amorphous carbon. Within the above ranges, the requirement of a Raman $R_{(90/10)}$ value can be easily satisfied, and, when the heat-treated product is used as a negative electrode active material in a non-aqueous electrolyte secondary battery, the input-output characteristics of a non-aqueous electrolyte secondary battery at a low temperature can be improved remarkably. Meanwhile, examples of an inert gas include nitrogen, and argon.

When a crusher mixer is adopted as an apparatus for mixing "graphite particles" and "carbon fine particles", there is no particular restriction on a specific apparatus, and a commercially-supplied apparatus may be adopted appropriately. Examples thereof include Rocking mixer, Loedige mixer, and Henschel mixer. Further, there is no particular restriction on a crushing and mixing condition, and the rotating speed of a crushing blade (chopper) is ordinarily 100 rpm or more, preferably 1,000 rpm or more, and more preferably 2,000 rpm or more; and ordinarily 100,000 rpm or less, preferably 30,000 rpm or less, and preferably 10,000 rpm or less. The crushing and mixing time is ordinarily 30 sec or more, preferably 1 min or more, and more preferably 10 min or more; and ordinarily 24 hours or less, preferably 3 hours or less, and more preferably 1 hour or less. Within the ranges, aggregation of "graphite particles" or "carbon fine particles" can be effectively prevented.

For producing a carbon material according to the present invention hybrid particles produced by the above production method may be additionally subjected to a crushing treatment.

Examples of a coarse crusher to be used for a crushing treatment include a jaw crusher, an impact crusher, and a cone crusher; examples of an intermediate crusher include a roll crusher, and a hammer mill; and examples of a pulverizing mill include a ball mill, a vibration mill, a pin mill, an agitation mill, and a jet mill.

Among them, a ball mill, and a vibration mill are preferable from a viewpoint of short crushing time and a high treatment rate.

The grinding speed is decided appropriately depending on the type and dimension of an apparatus, and, for example, in the case of a ball mill, it is ordinarily 50 rpm or more, preferably 100 rpm or more, more preferably 150 rpm or more, and further preferably 200 rpm or more; and ordinarily 2,500 rpm or less, preferably 2,300 rpm or less, and more preferably 2,000 rpm or less. If the speed is too high, regulation of a particle size tends to become difficult; and if the speed is too low, the treatment rate tends to decrease.

The grinding time is ordinarily 30 sec or more, preferable 1 min or more, more preferably 1 min 30 sec or more, and further preferably 2 min or more; and is ordinarily 3 hours or less, preferably 2.5 hours or less, and more preferably 2 hours or less. If the grinding time is too short, regulation of a particle size tends to become difficult, and if the grinding time is too long, the productivity tends to decrease.

In the case of a vibration mill, the grinding speed is ordinarily 50 rpm or more, preferably 100 rpm or more, more preferably 150 rpm or more, and further preferably 200 rpm or more; and ordinarily 2,500 rpm or less, preferably 2,300 rpm or less, and more preferably 2,000 rpm or less. If the speed is too high, regulation of a particle size tends to become difficult; and if the speed is too low, the treatment rate tends to decrease.

The grinding time is ordinarily 30 sec or more, preferably 1 min or more, more preferably 1 min 30 sec or more, and further preferably 2 min or more; and ordinarily 3 hours or less, preferably 2.5 hours or less, and more preferably 2 hours or less. If the grinding time is too short, regulation of a particle size tends to become difficult, and if the grinding time is too long, the productivity tends to decrease.

For producing a carbon material according to the present invention hybrid particles produced by the above production method may be subjected to a classification treatment with respect to particle size.

As for classification treatment conditions, a sieve opening is ordinarily 53 μm or less, preferably 45 μm or less, and more preferably 38 μm or less.

There is no particular restriction on an apparatus to be used for a classification treatment, and for example in the case of dry sieving, a rotary screen, a shaking screen, a spinning screen, a vibration screen, and the like can be used; in the case of dry pneumatic classification, a gravitational classifier, an inertial classifier, a centrifugal classifier (classifier, cyclone), and the like can be used; and in the case of wet sieving, a mechanical wet classifier, a hydraulic classifier, a sedimentary classifier, a centrifugal wet classifier, and the like can be used.

2. Negative Electrode for Non-aqueous Electrolyte Secondary Battery

A carbon material according to the present invention described above is a material exhibiting a superior function as a negative electrode active material, and a negative electrode for a non-aqueous electrolyte secondary battery using a carbon material according to the present invention as a negative electrode active material (hereinafter occasionally abbreviated as a "negative electrode according to the present invention") is another aspect of the present invention. A negative electrode means herein that constituted with a current collector and a negative electrode active material formed on the current collector. A negative electrode according to the present invention can provide a non-aqueous electrolyte secondary battery exhibiting favorable input-output characteristics even at a low temperature, and therefore is very useful as a negative electrode.

<Constitution of Negative Electrode and Production Method Therefor>

Any publicly known method may be used for producing a negative electrode according to the present invention insofar as advantageous effects of the present invention are not impaired remarkably. For example, a binding agent, and a solvent, and if necessary also a thickener, an electroconductive material, a filler, and the like are added to a carbon material according to the present invention to form a slurry, which is then coated on a current collector, dried, and pressed to form a negative electrode.

Alternatively, a method of forming a thin film layer containing a carbon material according to the present invention (negative electrode active material layer) by a technique, such as a vapor deposition process, a sputtering process, and a plating process may be sued.

(Binding Agent)

There is no particular restriction on a binding agent (binder) for binding a carbon material according to the present invention, insofar as it is a material stable to a non-aqueous electrolyte solution or a solvent used in producing an electrode.

Specific examples thereof include a polymer resin, such as polyethylene, polypropylene, poly(ethylene terephthalate), poly(methyl methacrylate), an aromatic polyamide, polyimide, poly(acrylic acid), cellulose, and nitrocellulose; a rubber-like polymer, such as SBR (styrene-butadiene rubber), isoprene rubber, butadiene rubber, fluorocarbon rubber, NBR (acrylonitrile-butadiene rubber), and ethylene-propylene rubber; a styrene-butadiene-styrene block copolymer or a hydrogenated derivative thereof; a thermoplastic elastomer type polymer, such as EPDM (ethylene-propylene-diene terpolymer), a styrene-ethylene-butadiene-styrene copolymer, and a styrene-isoprene-styrene block-copolymer, as well as a hydrogenated derivative thereof; a soft polymer resin, such as syndiotactic 1,2-polybutadiene, poly(vinyl acetate), an ethylene-vinyl acetate copolymer, and a propylene-α-olefin copolymer; a fluorine-containing polymer, such as poly(vinylidene fluoride), polytetrafluoroethylene, fluorinated poly(vinylidene fluoride), and a polytetrafluoroethylene-ethylene copolymer; and a polymer composition having ion conductivity for an alkali metal ion (especially lithium ion). The above may be used singly or in an optional combination of 2 or more kinds and at an optional ratio.

The percentage of a binding agent (binder) with respect to a negative electrode active material according to the present invention is preferably 0.1% by mass or more, further preferably 0.5% by mass or more, and especially preferably 0.6% by mass or more; and preferably 20% by mass or less, more preferably 15% by mass or less, further preferably 10% by mass or less, and especially preferably 8% by mass or less. If the percentage of a binding agent with respect to a negative electrode active material is beyond the above range, a portion of a binding agent that does not contribute to battery capacity may increase to invoke decrease in the battery capacity. If the same is below the range, decrease in the strength of a negative electrode may be invoked.

Especially, when a rubber-like polymer represented by SBR is contained as a main ingredient, the percentage of a binding agent with respect to a negative electrode active material is ordinarily 0.1% by mass or more, preferably 0.5% by mass or more, and further preferably 0.6% by mass or more; and ordinarily 6% by mass or less, preferably 5% by mass or less, and further preferably 4% by mass or less. Meanwhile, when a fluorine-containing polymer represented by poly(vinylidene fluoride) is contained as a main ingredient, the percentage with respect to a negative electrode active material is ordinarily 1% by mass or more, preferably 2% by mass or more, and further preferably 3% by mass or more; and ordinarily 15% by mass or less, preferably 10% by mass or less, and further preferably 8% by mass or less.

(Solvent)

There is no particular restriction on the type of a solvent for forming a slurry, insofar as the same can dissolve or disperse a negative electrode active material and a binding agent, as well as a thickener and an electroconductive material, which are used according to need, and either of an aqueous solvent and an organic solvent may be used.

Examples of an aqueous solvent include water, and alcohol, and examples of an organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethyl ether, dimethylacetamide, hexamethylhosphalamide, dimethyl sulfoxide, benzene, xylene, quinoline, pyridine, methylnaphthalene, and hexane.

Especially, when an aqueous solvent is used, it is preferable that a slurry is formed using a latex such as SBR, by adding a dispersing agent, and the like together with a thickener. The above solvents may be used singly or in an optional combination of 2 or more kinds and at an optional ratio.

(Thickener)

A thickener is used ordinarily for adjusting the viscosity of a slurry. There is no particular restriction on a thickener, and specific examples of the same include carboxymethylcellulose, methylcellulose, hydroxymethylcellulose, ethylcellulose, poly(vinyl alcohol), oxidized starch, phosphorylated starch, casein, and salts of them. The above may be used singly or in an optional combination of 2 or more kinds and at an optional ratio.

When a thickener is used, the percentage of a thickener with respect to a negative electrode active material is ordinarily 0.1% by mass or more, preferably 0.5% by mass or more, and further preferably 0.6% by mass or more; and ordinarily 5% by mass or less, preferably 3% by mass or less, and further preferably 2% by mass or less. When the percentage of a thickener with respect to a negative electrode active material is below the range, the coating property may be deteriorated remarkably. Meanwhile, beyond the range, the percentage in a negative electrode active material layer occupied by a negative electrode active material decreases, and the battery capacity may decrease disadvantageously, or the resistance between the negative electrode active materials may increase.

(Conductive Additive)

A conductive additive may be any electron-conductive material that does not cause a chemical change at a charge and discharge potential. For example, a carbon black, such as acetylene black, Ketjen black, channel black, furnace black, lamp black, and thermal black; a conductive fiber, such as carbon fiber, and vapor grown carbon fiber (VGCF), and metal fiber; carbon fluoride; and a metal powder such as copper may be added singly or as a mixture thereof. Among the conductive additives, acetylene black, and VGCF are especially preferable. They may be used singly or in a combination of 2 or more kinds thereof. Although there is no particular restriction on the addition amount of a conductive additive, the same with respect to a negative electrode active material is preferably 1 to 30% by mass, and especially preferably 1 to 15% by mass.

(Current Collector)

As a current collector, which holds a carbon material according to the present invention, a publicly known material may be used arbitrarily. Examples of a current collector for a negative electrode include a metal material, such as aluminum, copper, nickel, stainless steel, and nickel plated steel, and copper is especially preferable from viewpoints of processability and cost.

When a current collector is made of a metal material, examples of the form of a current collector include a metal foil, a metal cylinder, a metal coil, a metal plate, a metal thin film, an expanded metal, a punching metal, and a metal foam. Among them, a metal thin film is preferable, and a copper foil is more preferable, of which both a rolled copper foil by a rolling process and an electrolytic copper foil by an electrolysis process can be further preferably used as a current collector.

The thickness of a current collector is ordinarily 1 μm or more, and preferably 5 μm or more; and ordinarily 500 μm or less, and preferably 30 μm or less. This is because, when a negative electrode current collector is too thick, the battery overall capacity may decrease excessively, and, conversely, when the same is too thin, handling may become difficult.

(Ratio of Thickness Between Negative Electrode Active Material Layer and Current Collector)

Although there is no particular restriction on the ratio of thickness between a negative electrode active material layer and a current collector, the value of "(the thickness of a single layer of a negative electrode active material right before injection of a non-aqueous electrolyte solution)/(the thickness of a current collector)" is preferably 150 or less, further preferably 20 or less, and especially preferably 10 or less; and preferably 0.1 or more, further preferably 0.4 or more, and especially preferably 1 or more. When the thickness of a negative electrode active material layer to the thickness of a current collector is beyond the range, heat may be generated at a current collector due to Joule's heat on the occasion of high current density charge and discharge. When the same is below the range, the volume ratio of a current collector with respect to a negative electrode active material increases and the battery capacity may decrease.

(Void Ratio)

Although there is no particular restriction on the void ratio of a negative electrode, it is ordinarily 10% or more, and preferably 20% or more; and ordinarily 50% or less, and preferably 40% or less. When the void ratio of a negative electrode is below the range, voids in a negative electrode become too few and an electrolyte solution can hardly penetrate, so that preferable battery characteristic may become hardly obtainable. Meanwhile, when the same is beyond the range, voids in a negative electrode become too much and the strength of a negative electrode becomes too low, so that preferable battery characteristic may become hardly obtainable. As the void ratio of a negative electrode, a percentage value of the total pore volume obtained by a pore size distribution measurement of a negative electrode with a mercury porosimeter divided by an apparent volume of a negative electrode active material layer except a current collector, is used.

(Peel Strength)

Since there are microspikes forming fine flow channels on a surface of a negative electrode active material according to the present invention, the peel strength of the negative electrode is enhanced due to increase in the number of bonding points among particles. In a negative electrode using a carbon material according to the present invention the detachment strength (peel strength) of a negative electrode active material layer from a current collector is ordinarily 1 mN/mm or more, preferably 5 mN/mm or more, more preferably 6 mN/mm or more, and further preferably 10 mN/mm or more; and ordinarily 100 mN/mm or less. Within the range, detachment of a negative electrode active material layer from a current collector during production of a negative electrode can be suppressed and the yield can be advantageously improved.

As the peel strength, a value measured by the following method is used. A negative electrode sheet was cut to 20 mm-wide, and fixed (an active material side was bonded with a double face adhesive tape) to a stainless steel test plate with a double face adhesive tape, which is then fixed horizontally, and an edge of the negative electrode sheet was held by a clamping unit of a universal testing machine. The fixing unit for a negative electrode sheet of the universal testing machine is lowered vertically without changing other conditions, such that the negative electrode sheet was pulled for peeling at an angle of 90° from double face adhesive tape. During such a procedure, an average value of a force worked between the negative electrode sheet and the double face adhesive tape is measured, and a quotient of the average value divided by the width of a negative electrode sheet sample (20 mm) is used as a peel strength value (mN/mm).

3. Non-aqueous Electrolyte Secondary Battery

As described above, a negative electrode according to the present invention is useful as a negative electrode for a non-aqueous electrolyte secondary battery, and a non-aqueous electrolyte secondary battery using a negative electrode according to the present invention is also an aspect of the present invention (hereinafter occasionally abbreviated as a "non-aqueous electrolyte secondary battery according to the present invention"). The basic constitution of a non-aqueous electrolyte secondary battery according to the present invention, especially a lithium ion secondary battery, is similar to that of a heretofore known lithium ion secondary battery, and ordinarily provided with a positive electrode and a negative electrode that can absorb and release a metal ion, and with an electrolyte solution. As a negative electrode, the aforedescribed negative electrode according to the present invention is used.

<Constitution of Positive Electrode and Production Method Therefor>

Any publicly known method may be used for producing a positive electrode insofar as advantageous effects of the present invention are not impaired remarkably. For example, a method, by which a binding agent, a solvent, an electro-conductive material, a thickener, and the like are added to a positive electrode active material to form a slurry, and the same is then coated on a current collector, dried, and pressed to form a positive electrode, may be used.

(Positive Electrode Active Material)

A positive electrode active material (lithium transition metal compound) to be used for a positive electrode will be described below. A lithium transition metal compound is a compound having a structure, which can absorb and discharge a lithium ion, and examples thereof include a sulfide, a phosphate compound, and a lithium transition metal complex oxide. Examples of a sulfide include a compound having a two-dimensional layer structure, such as $TiS_2$ and $MoS_2$, and a Chevrel compound having a strong three-dimensional skeletal structure expressed by a general formula $Me_xMo_6S_8$ (Me is a variety of transition metals, such as Pb, Ag, and Cu). Examples of a phosphate compound include those having an olivine structure, expressed generally by $LiMePO_4$ (Me is at least one kind of transition metal), and specific examples include $LiFePO_4$, $LiCoPO_4$, $LiNiPO_4$, and $LiMnPO_4$. Examples of a lithium transition metal complex oxide include those having a spinel structure allowing three-dimensional diffusion, or a layer structure allowing two-dimensional diffusion of a lithium ion. Those having a spinel structure are generally expressed by $LiMe_2O_4$ (Me is at least one kind of transition metal), and specific examples thereof include $LiMn_2O_4$, $LiCoMnO_4$, $LiNi_{0.5}Mn_{1.5}O_4$, and $LiCoVO_4$. Those having a layer structure are generally expressed by $LiMeO_2$ (Me is at least one kind of transition metal), and specific examples thereof include $LiCoO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$, and $LiMnO_2$.

Examples of a lithium-containing transition metal compound include a lithium transition metal compound expressed by the following compositional formula (A) or (B).

1) Case of Lithium Transition Metal Compound Expressed by the Following Compositional Formula (A)

$$Li_{1+x}MO_2 \quad (A)$$

wherein x is ordinarily from 0 to 0.5; M is elements consisting of Ni and Mn, or Ni, Mn and Co; the molar ratio of Mn/Ni is ordinarily from 0.1 to 5; the molar ratio of Ni/M is ordinarily from 0 to 0.5; and the molar ratio of Co/M is ordinarily from 0 to 0.5. The over-stoichiometric portion of Li expressed by x may be occasionally substituted at a transition metal site M.

Although in the compositional formula (A) the amount of oxygen is expressed by an atom ratio of 2 for convenience sake, there may be some non-stoichiometry. Further, x in the compositional formula is related to the composition initially charged in a production stage of a lithium transition metal compound. Ordinarily, a battery to be sent to market is subjected to aging after a battery is assembled. Consequently, deficiency in the Li amount of a positive electrode may have occurred due to charge and discharge. In such a case, by a chemical composition analysis after a discharge to 3 V, measurement of x may give a value from −0.65 to 1.

A lithium transition metal compound, which has been fired by a high temperature firing in an atmosphere of an oxygen-containing gas for increasing crystallinity of a positive electrode active material, is superior in battery characteristics.

Further, a lithium transition metal compound expressed by the compositional formula (A) may be a solid solution with $Li_2MO_3$ called as 213 layer according to the following general formula (A').

$$\alpha Li_2MO_3 \cdot (1-\alpha)LiM'O_2 \quad (A')$$

wherein α is a number satisfying 0<α<1; M is at least one kind of metal element whose average oxidation number is $4^+$, and specifically at least one kind of metal element selected from the group consisting of Mn, Zr, Ti, Ru, Re and Pt; and M' is at least one kind of metal element whose average oxidation number is $3^+$, and preferably at least one kind of metal element selected from the group consisting of V, Mn, Fe, Co and Ni, and more preferably at least one kind of metal element selected from the group consisting of Mn, Co and Ni.

2) Case of Lithium Transition Metal Compound Expressed by the Following Compositional Formula (B)

$$Li[Li_aM_bMn_{2-b-a}]O_4^{+\delta} \quad (B)$$

wherein M is an element composed of at least one kind of transition metal selected from the group consisting of Ni, Cr, Fe, Co, Cu, Zr, Al, and Mg.

The value of b is ordinarily from 0.4 to 0.6. When the value of b is within the range, the energy density per unit weight of a lithium transition metal compound is high. Meanwhile, the value of a is ordinarily from 0 to 0.3. Further, a in the compositional formula is related to the composition initially charged in a production stage of a lithium transition metal compound. Ordinarily, a battery to be sent to market is subjected to aging after a battery is assembled. Consequently, deficiency in the Li amount of a positive electrode may have occurred due to charge and discharge. In such a case, by a chemical composition analysis after a discharge to 3 V, measurement of a may give a value from −0.65 to 1. When the value of a is within the range, the energy density per unit weight of a lithium transition metal compound is not impaired significantly, and favorable load characteristics can be obtained. Further, the value of δ is ordinarily in a range of ±0.5. When the value of δ is within the range, the stability of a crystal structure is high and a battery with an electrode produced using the lithium transition metal compound is superior in terms of cycle performance and high temperature stability.

The chemical meaning of a lithium composition in a lithium nickel manganese complex oxide as a composition of a lithium transition metal compound will be described more precisely below. a and b in the compositional formula of a lithium transition metal compound are determined through a calculation based on a ratio of Li/Ni/Mn obtained by analyzing each transition metal and lithium with an inductively-coupled plasma atomic emission spectroscopic analyzer (ICP-AES). From a structural viewpoint, lithium related to a is conceivably in the same transition metal site as substituted. In this case, according to the electroneutrality principle by reason of the lithium related to a, the average valency of M and manganese becomes larger than 3.5. Further, the lithium transition metal compound may be substituted with fluorine and expressed as $LiMn_2O_{4-x}F_{2x}$.

Specific examples of a lithium transition metal compound with the above composition include $Li_{1+x}Ni_{0.5}Mn_{0.5}O_2$, $Li_{1+x}Ni_{0.85}Co_{0.10}Al_{0.05}O_2$, $Li_{1+x}Ni_{0.33}Mn_{0.33}Co_{0.33}O_2$, $Li_{1+x}Ni_{0.45}Mn_{0.45}Co_{0.1}O_2 Li_{1+x}Mn_{1.8}Al_{0.2}O_4$, and $Li_{1+x}Mn_{1.5}Ni_{0.5}O_4$. The lithium transition metal compounds may be used singly or in a blend of 2 or more kinds thereof.

The lithium transition metal compound may introduce another element. Such other element is 1 or more kinds selected from the group consisting of B, Na, Mg, Al, K, Ca, Ti, V, Cr, Fe, Cu, Zn, Sr, Y, Zr, Nb, Ru, Rh, Pd, Ag, In, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, S, Cl, Br, I, As, Ge, P, Pb, Sb, Si, and Sn. Such other elements may be incorporated in the crystal structure of a lithium transition metal compound, or localized on a particle surface or at a crystal grain boundary as an elementary substance or a compound without being incorporated in the crystal structure of a lithium transition metal compound.

The content of a lithium transition metal compound powder in a positive electrode active material layer is ordinarily 10% by weight or more to 99.9% by weight or less. When the content of a lithium transition metal compound powder in a positive electrode active material layer is too high, the strength of a positive electrode tends to become insufficient, and when it is too low, the capacity may become insufficient.

(Binding Agent)

There is no particular restriction on a binding agent (binder) to be used for producing a positive electrode active material layer, insofar as it is a material stable to a liquid medium used in production of an electrode, in the case of a coating process. Specific example thereof include a polymer resin, such as polyethylene, polypropylene, poly(ethylene terephthalate), poly(methyl methacrylate), an aromatic polyamide, cellulose, and nitrocellulose; a rubber-like polymer, such as SBR (styrene-butadiene rubber), NBR (acrylonitrile-butadiene rubber), fluorocarbon rubber, isoprene rubber, butadiene rubber, and ethylene-propylene rubber; a styrene-butadiene-styrene block copolymer, and a hydrogenated derivative thereof; a thermoplastic elastomer type polymer, such as EPDM (ethylene-propylene-diene terpolymer), a styrene-ethylene-butadiene-ethylene copolymer, and a styrene-isoprene-styrene block-copolymer, as well as a hydrogenated derivative thereof; a soft polymer resin, such as syndiotactic 1,2-polybutadiene, poly(vinyl acetate), an ethylene-vinyl acetate copolymer, and a propylene-α-olefin copolymer; a fluorine-containing polymer, such as poly (vinylidene fluoride), polytetrafluoroethylene, fluorinated poly(vinylidene fluoride), and a polytetrafluoroethylene-ethylene copolymer; and a polymer composition having ion conductivity for an alkali metal ion (especially lithium ion). The above substances may be used singly or in an optional combination of 2 or more kinds and at an optional ratio.

The content of a binding agent in a positive electrode active material layer is ordinarily 0.1% by weight or more and 80% by weight or less. When the content of a binding agent is too low, a positive electrode active material cannot be retained sufficiently and the mechanical strength of a positive electrode becomes insufficient so that the battery performance such as cycle performance may be deteriorated. On the other hand when the same is too high, it may possibly invoke decrease in battery capacity or electrical conductivity.

(Solvent)

There is no particular restriction on the type of a liquid medium for forming a slurry, insofar as it is a solvent that can dissolve or disperse a lithium transition metal compound powder, and a binding agent, as well as an electroconductive material and a thickener, which are used according to need, and either of an aqueous solvent and an organic solvent may be used. Examples of an aqueous solvent include water, and alcohol, and examples of an organic solvent may include N-methyl pyrrolidone (NMP), dimethylformamide, dimethylacetamide, methyl ethyl ketone, cyclohexanone, methyl acetate, methyl acrylate, diethyltriamine, N,N-dimethylaminopropylamine, ethylene oxide, tetrahydrofuran (THF), toluene, acetone, dimethyl ether, dimethylacetamide, hexamethylphosphalamide, dimethyl sulfoxide, benzene, xylene, quinoline, pyridine, methylnaphthalene, and hexane. Especially, when an aqueous solvent is used, a slurry is formed using a latex such as SBR, by adding a dispersing agent together with a thickener. The above solvents may be used singly or in an optional combination of 2 or more kinds and at an optional ratio.

(Electroconductive Material)

To a positive electrode active material layer, an electroconductive material is added ordinarily in order to enhance the electrical conductivity. Although there is no particular restriction on the type thereof, specific examples include a metal material, such as copper, and nickel; and a carbon material such as graphite, e.g. natural graphite, or artificial graphite, carbon black, e.g. acetylene black, and amorphous carbon, e.g. needle coke. The above substances may be used singly or in an optional combination of 2 or more kinds and at an optional ratio. The content of an electroconductive material in a positive electrode active material layer is ordinarily 0.01% by weight or more and 50% by weight or less. When the content of an electroconductive material is too low, the electrical conductivity may become insufficient, and conversely when the content is too high, the battery capacity may be decreased.

(Current Collector)

As a material for a positive electrode current collector, a metal material, such as aluminum, stainless steel, nickel plating, titanium, and tantalum; a carbon material, such as carbon cloth, and carbon paper are ordinarily used. Examples of the form include, in the case of a metal material, a metal foil, a metal cylinder, a metal coil, a metal plate, a metal thin film, an expanded metal, a punching metal, and a metal foam; and include, in the case of a carbon material, a carbon plate, a carbon thin film, and a carbon cylinder. A thin film may be optionally formed into a mesh-form.

When a thin film is used as a positive electrode current collector, the thickness of the same is optional, and ordinarily a range from 1 μm to 100 mm is convenient. When it is thinner than the above range, the strength required for a current collector may possibly not be satisfied, on the other hand when it is thicker than the above range, the handling property may be impaired possibly.

The thickness of a positive electrode active material layer is ordinarily approx. 10 to 200 μm. The electrode density of a positive electrode after pressing is ordinarily, from 2.2 $g/cm^3$ to 4.2 $g/cm^3$. A positive electrode active material layer obtained after coating and drying is preferably consolidated by a roller press, and the like for increasing the bulk density of a positive electrode active material.

<Non-Aqueous Electrolyte>

As a non-aqueous electrolyte, for example, a non-aqueous electrolyte solution, a polymer solid electrolyte, a gel electrolyte, an inorganic solid electrolyte, and the like, which have been publicly known, can be used. Among others, a non-aqueous electrolyte solution is preferable. A non-aqueous electrolyte solution is formed by dissolving a solute (electrolyte) in a non-aqueous solvent.

(Electrolyte)

There is no particular restriction on an electrolyte to be used for a non-aqueous electrolyte solution, and any of those used commonly as an electrolyte may be selected arbitrarily for use therein. When a non-aqueous electrolyte solution according to the present invention is used in a non-aqueous electrolyte secondary battery, a lithium salt is preferable as an electrolyte. Specific examples of an electrolyte include $LiPF_6$, $LiBF_4$, $LiCF_3SO_3$, $LiN(CF_3SO_2)_2$, $LiN(C_2F_5SO_2)_2$, lithium bis(oxalato)borate, lithium difluoro (oxalate)borate, lithium tetrafluoro (oxalato)phosphate, lithium difluoro-bis (oxalato)phosphate, and lithium fluorosulfonate. The above electrolytes may be used singly or in an optional combination of 2 or more kinds and at an optional ratio.

The concentration of a lithium salt ion in an electrolyte solution may be selected arbitrarily and is in an range of ordinarily 0.5 mol/L or more, preferably 0.6 mol/L or more, and more preferably 0.8 mol/L or more; and ordinarily 3 mol/L or less, preferably 2 mol/L or less, and more preferably 1.5 mol/L or less. When the total mol concentration of lithium is within the range, the electric conductivity of an electrolyte solution becomes sufficient, meanwhile decrease in the electric conductivity and decrease in the battery performance due to viscosity increase can be prevented.

(Non-Aqueous Solvent)

There is no particular restriction on a non-aqueous solvent contained in a non-aqueous electrolyte solution, insofar as it is a solvent not exerting a negative influence on battery characteristics when used in a battery. Examples of an ordinarily used non-aqueous solvent include an open-chain carbonate, such as dimethyl carbonate, ethyl methyl carbonate, and diethyl carbonate; a cyclic carbonate, such as ethylene carbonate, fluoroethylene carbonate, ethynylethylene carbonate, propylene carbonate, and butylene carbonate; an open-chain carboxylic acid ester, such as methyl acetate, ethyl acetate, methyl propionate, and ethyl propionate; a cyclic carboxylic acid ester, such as γ-butyrolactone; an open-chain ether, such as dimethoxyethane, and diethoxyethane; a cyclic ether, such as tetrahydrofuran, 2-methyltetrahydrofuran, and tetrahydropyran; a nitrile, such as acetonitrile, propionitrile, benzonitrile, butyronitrile, and valeronitrile; a phosphoric acid ester, such as trimethyl phosphate, and triethyl phosphate; and a sulfur-containing compound, such as ethylene sulfite, 1,3-propanesultone, methyl methanesulfonate, sulfolane, and dimethyl sulfone, and a hydrogen atom of the compounds may be substituted partly with a halogen atom. The above may be used singly or in a combination of 2 or more kinds, and it is preferable that a combination of 2 or more kinds is used. For example, a combination of a high dielectric constant solvent, such as a cyclic carbonate and a cyclic carboxylic acid ester, and a low viscosity solvent, such as an open-chain carbonate and an open-chain carboxylic acid ester, is preferable.

A high dielectric constant solvent means a compound whose relative dielectric constant at 25° C. is 20 or more. Among high dielectric constant solvents, ethylene carbonate, propylene carbonate, or a compound derived therefrom by substituting a hydrogen atom with another element such as halogen, or an alkyl group, and the like is preferably contained in an electrolyte solution. The content of a high dielectric constant solvent in an electrolyte solution is preferably 15% by weight or more, further preferably 20% by weight or more, and most preferably 25% by weight or more. When the content of a high dielectric constant solvent is below the range, desired battery characteristics may be occasionally not be obtained.

(Adjuvant)

Into a non-aqueous electrolyte solution, an adjuvant may added appropriately according to an object in addition to the electrolyte, and the non-aqueous solvent. Examples of an adjuvant having an effect for improving the lifetime of a battery by forming a coated film on a surface of a negative electrode include an unsaturated cyclic carbonate, such as vinylene carbonate, vinyl ethylene carbonate, and ethynylethylene carbonate; a fluorine atom-containing cyclic carbonate, such as fluoroethylene carbonate; and a fluorinated unsaturated cyclic carbonate, such as 4-fluorovinylene carbonate. Examples of an overcharge prevention agent, which suppresses effectively explosion or ignition of a battery, when a battery is overcharged, or otherwise, include an aromatic compound, such as biphenyl, cyclohexylbenzene, diphenyl ether, t-butylbenzene, t-pentylbenzene, diphenyl carbonate, and methyl phenyl carbonate. Examples of an adjuvant for improving cycle performance or low temperature discharge characteristics include a lithium salt, such as lithium monofluorophosphorate, lithium difluorophosphosphate, lithium fluorosulfonate, lithium bis(oxalato)borate, lithium difluoro(oxalato)borate, lithium tetrafluoro(oxalate) phosphate, and lithium difluoro bis(oxalato)phosphate. Examples of an adjuvant for improving capacity maintenance characteristics through high temperature storage, or cycle performance include a sulfur-containing compound, such as ethylene sulfite, propane sultone, and propene sultone; carboxylic anhydride, such as succinic anhydride, maleic anhydride, and citraconic anhydride; and a nitrile compound, such as succinonitrile, glutaronitrile, adiponitrile, and pimelonitrile. There is no particular restriction on the content of an adjuvant, and it is free unless advantageous effects of the present invention are not impaired.

A non-aqueous electrolyte solution may be formed into a solid electrolyte in a gel form, a rubber form, or a solid sheet form by adding an organic polymer compound into an electrolyte solution. In this case, specific examples of an organic polymer compound include a polyether polymer, such as polyethylene oxide, and polypropylene oxide; a crosslinked polymer of a polyether polymer; a vinyl alcohol polymer, such as poly(vinyl alcohol), and poly(vinyl butyral); an insolubilized vinyl alcohol polymer; polyepichlorohydrin; polyphosphazene; polysiloxane; a vinyl polymer, such as poly(vinyl pyrrolidone), poly(vinylidene carbonate), and polyacrylonitrile; and a copolymer, such as poly[(ω-methoxy) oligo (oxyethylene) methacrylate], and poly[(ω-methoxy) oligo (oxyethylene) methacrylate-co-methyl methacrylate].

<Separator>

A separator is ordinarily intercalated between a positive electrode and a negative electrode for preventing a short circuit. In this case, a non-aqueous electrolyte solution according to the present invention is ordinarily impregnated in the separator.

There is no particular restriction on the material and form of a separator, and those publicly known may be adopted arbitrarily insofar as advantageous effects of the present invention are not significantly impaired. Among others, those made of a material stable to a non-aqueous electrolyte solution according to the present invention, such as a resin, a glass fiber, and an inorganic substance, and in a form of a porous sheet or a nonwoven fabric, superior in liquid retentivity are preferably used.

As materials for a resin separator, and a glass fiber separator, for example, polyolefin, such as polyethylene, and polypropylene, an aromatic polyamide, polytetrafluoroethylene, poly(ether sulfone), a glass filter, and the like can be used. Among them, a glass filter, and polyolefin are preferable, and polyolefin is further preferable. The above materials may be used singly or in an optional combination of 2 or more kinds and at an optional ratio.

Although the thickness of a separator is optional, it is ordinarily 1 μm or more, preferably 5 μm or more, and further preferably 10 μm or more; and ordinarily 50 μm or less, preferably 40 μm or less, and further preferably 30 μm or less. When a. separator is thinner than the above range, the insulation quality or the mechanical strength may be deteriorated. When a separator is thicker than the above range, not only the battery performance such as rate characteristics may be deteriorated, but also the energy density of a non-aqueous electrolyte secondary battery as a whole may sometimes decrease.

Further, when a porous material, such as a porous sheet, and a nonwoven fabric, is used for a separator, although the porosity of a separator is optional, it is ordinarily 20% or more, preferably 35% or more, and further preferably 45% or more; and ordinarily 90% or less, preferably 85% or less, and further preferably 75% or less. When the porosity is less than the above range, the film resistance becomes large so that rate characteristics tend to deteriorate. When the porosity is more than the above range, the mechanical strength of a separator decreases, and the insulation quality tends to decrease.

The average pore size of a separator is also optional, and it is ordinarily 0.5 μm or less, and preferably 0.2 μm or less; and ordinarily 0.05 μm or more. When the average pore size is beyond the range, a short circuit tends to occur easily, and below the range, the film resistance increases so that rate characteristics may sometimes deteriorated.

Meanwhile, as an inorganic material, for example, an oxide, such as alumina, and silicon dioxide; a nitride, such as aluminum nitride, and silicon nitride; and a sulfate, such as barium sulfate, and calcium sulfate, are used, and those in a particle form or a fiber form are used.

With respect to the form, a thin film form, such as nonwoven fabric, woven cloth, and porous film, is applied. A thin film form, with a pore size of 0.01 to 1 μm, a thickness of 5 to 50 μm, is used favorably. In addition to an independent thin film form, a separator, in which a composite porous layer containing particles of the inorganic material is formed using a binding material made of a resin on a surface layer of a positive electrode and/or a negative electrode, may be used. For example, a porous layer is formed on both sides of a positive electrode with alumina particle having a $D_{90}$ particle size less than 1 μm using a fluorine resin as a binding material.

A property of a separator in a non-aqueous electrolyte secondary battery can be grasped with a Gurley value. A Gurley value indicates difficulty of air to pass through a film in the thickness direction, and is expressed by time in sec required for 100 mL of air to pass through the film. Therefore, a small value means easy to pass, and a large value means difficult to pass. In other words, a smaller value means better communication in the thickness direction of a film, and a larger value means poorer communication in the thickness direction of a film. Communication reflects continuity of pores in the thickness direction of a film. When the Gurley value of a separator according to the present invention is low, there can be many applications. For example, when a separator is used in a non-aqueous lithium secondary battery, a low Gurley value means easy movement of a lithium ion, which is preferable because of superior battery performance. The Gurley value of a separator is optional, and preferably 10 to 1000 sec/100 mL, more preferably 15 to 800 sec/100 mL, and further preferably 20 to 500 sec/100 mL. When a Gurley value is 1000 sec/100 mL or less, the electrical resistance is practically low, and preferable for a separator.

<Battery Design>

An electrode assembly may adopt either of a layered structure constituted with the positive plate and the negative plate intercalating the separator, and a spirally wound structure constituted with the positive plate and the negative plate intercalating the separator. The percentage of the inner volume of battery occupied by the volume of an electrode assembly (hereinafter referred to as "electrode assembly occupancy") is ordinarily 40% or more, and preferably 50% or more; and ordinarily 90% or less, and preferably 80% or less.

When the electrode assembly occupancy is below the range, the battery capacity decreases, and when the same is beyond the range, a void space becomes short and the battery temperature becomes high so that the components expand or the vapor pressure of a liquid ingredient of an electrolyte becomes high to increase the internal pressure, leading to deterioration of various battery characteristics, such as charge and discharge cyclic performance and high temperature storage stability, or even to activation of a gas release valve for releasing outward the internal pressure.

<Outer Case>

There is no particular restriction on the material of an outer case, insofar as it is stable to a non-aqueous electrolyte solution to be used. Specifically, a metal, such as a nickel plated steel plate, stainless steel, aluminum, an aluminum alloy, and a magnesium alloy, or a laminated film of a resin and an aluminum foil (laminate film) is used. From a viewpoint of weight reduction a metal, such as aluminum and an aluminum alloy, or a laminate film is used favorably.

Examples of an outer case using a metal include those formed to a hermetically sealed structure by welding together metal parts by laser welding, resistance welding, or ultrasonic welding, and formed to a caulked structure using the metal parts sandwiching a resin gasket. Examples of an outer case using the laminate film include those formed to a hermetically sealed structure by heat-sealing resin layers together. In order to improve the heat-sealability, a resin different from a resin used for the laminate film may be sandwiched between the resin layers. Especially when a hermetically closed structure is formed by heat-sealing resin layers through the intermediary of a collector terminal, since a bond between a metal and a resin is formed, as a sandwiched resin a resin having a polar group or a modified resin having introduced a polar group is used favorably.

<Protection Element>

As a protection element, a PTC (Positive Temperature Coefficient) element, which increases resistance in the event of abnormal heat generation or excessive current, a thermal fuse, a thermistor, or a valve, which cuts off current flowing in a circuit due to sudden increase of the internal pressure or internal temperature of a battery in the event of abnormal heat generation, may be used. It is preferable to select a protection element, which is not activated in an ordinary use at a high current, and further preferable that the system is designed not to run into abnormal heat generation or thermal runaway even without a protection element.

<Outer Package>

A non-aqueous electrolyte secondary battery according to the present invention is ordinarily configured such that a non-aqueous electrolyte solution, a negative electrode, a positive electrode, a separator, etc. described above are contained in an outer package. There is no particular restriction on the outer package, and a publicly known package may be adopted arbitrarily, insofar as advantageous effects of the present invention are not impaired. Specifically, although the outer package material may be selected arbitrarily, ordinarily, for example, nickel plated iron, stainless steel, aluminum or its alloy, nickel, titanium are used.

Further, the form of an outer package is also optional, and it may be, for example, any of a cylindrical form, a rectangular form, a laminate form, a coin form, and a large form

EXAMPLES

Next, the present invention will be described in more detail by way of Examples, provided that the present invention be not limited by the Examples by any means unless departing from the spirit and scope of the invention.

Example 1

(Preparation of Negative Electrode for Non-aqueous Electrolyte Secondary Battery)

To 100 parts by mass of graphite particles having a volume-based average particle diameter ($D_{50}$) of 10.6 µm, a BET specific surface area (SA) of 8.8 m$^2$/g, and a tapped density of 0.89 g/cm$^3$, 3 parts by mass of carbon black having a primary particle diameter of 40 nm, a BET specific surface area (SA) of 62 m$^2$/g, and a DBP oil absorption amount of 338 mL/100 g was added, and the mixture was stirred by a rotary mixer having a disintegrating mechanism with a chopper for a carbon black aggregate and a powder mixing mechanism with a rotating shovel at a chopper rotating speed of 3000 rpm for 20 min. The mixed powder and a petroleum heavy oil obtained during thermal cracking of naphtha as a precursor of amorphous carbon were mixed, and subjected to a heat treatment in an inert gas at 1100° C. The heat treated product was crushed and classified to obtain a multilayer structure carbon material, in which carbon black fine particles and amorphous carbon were coated on a surface of graphite particles.

It was confirmed from the yield of the heat treatment that the obtained multilayer structure carbon material was coated with 3 parts by mass of amorphous carbon with respect to 100 parts by mass of graphite.

With respect to the sample, a volume-based average particle diameter ($D_{50}$), a BET specific surface area, a tapped density, a Raman R value, a Raman $R_{(90/10)}$ value, and a total pore volume (≤200 nm) were measured or calculated according to the above measurement methods. The results are shown in Table 1.

<Production of Negative Electrode Sheet>

Using the multilayer structure carbon material prepared in the above Example as a negative electrode active material, a pole plate having an active material layer with an active material layer density of 1.60±0.03 g/cm$^3$ was produced. Specifically, to 20.00±0.02 g of a negative electrode material, 20.00±0.02 g of a 1% by mass aqueous solution of sodium carboxymethylcellulose (0.200 g in terms of solid content), and 0.50±0.05 g of an aqueous dispersion of a styrene-butadiene rubber with a weight-average molecule amount of 270,000 (0.2 g in terms of solid content) were added and the mixture was agitated by a hybrid mixer produced by Keyence Corporation for 5 min and then degassed for 30 sec to obtain a slurry.

The slurry was coated in a width of 5 cm on an 18 µm-thick copper foil, which was a current collector, with a doctor blade, such that 14.5±0.3 mg/cm$^2$ of a negative electrode material was fixed, and then air-dried at room temperature. The work was further dried at 110° C. for 30 min, and then roll-pressed with a 20 cm diameter roller such that the density of an active material layer was adjusted to 1.60±0.03 g/cm$^3$ to obtain an electrode sheet.

<Peel Strength>

A negative electrode sheet produced according to the above method was cut to 20 mm-wide, and fixed (an active material side was bonded with a double face adhesive tape) to a stainless steel test plate with a double face adhesive tape, which is then fixed horizontally, and an edge of the negative electrode sheet was held by a clamping unit of a universal testing machine. The fixing unit of the universal testing machine is lowered vertically without changing other conditions, such that the negative electrode sheet was pulled for peeling at an angle of 90° from double face adhesive tape. During such a procedure, an average value of a force worked between the negative electrode sheet and the double face adhesive tape was measured, and a quotient of the average value divided by the width of a negative electrode sheet sample (20 mm) was used as a peel strength value (mN/mm).

<Production of Positive Electrode Sheet>

With respect to a positive electrode, 90% by mass of lithium nickel manganese cobalt oxide (LiNiMnCoO$_2$) as a positive electrode active material, 7% by mass of acetylene black as an electroconductive material, and 3% by mass of poly(vinylidene fluoride) (PVdF) as a binding agent were mixed in a N-methylpyrrolidone solvent to obtain a slurry.

The slurry was coated on a 15 µm-thick aluminum foil, which was a current collector, with a blade coater, such that 25.6±0.5 mg/cm$^2$ of the positive electrode material was fixed, and then dried at 130° C. The work was further roll-pressed such that the density of a positive electrode was adjusted to 2.60±0.05 g/cm$^3$ to obtain an electrode sheet.

<Production of Lithium Ion Secondary Battery (2016 Coin Battery)>

A 12.5 mm-diameter disk was punched out from a negative electrode sheet produced according to the above method, and a 14 mm-diameter disk was punched out from a lithium metal foil as a counter electrode. Between both the electrodes, a separator (made of porous polyethylene film) impregnated with an electrolyte solution having dissolved LiPF$_6$ to 1 mol/L in a mixed solvent of ethylene carbonate and ethyl methyl carbonate (volume ratio=3:7) was placed to produce each 2016 coin battery.

<Initial Irreversible Capacity, Discharge Capacity, Initial Efficiency>

The initial irreversible capacity and the discharge capacity at battery charging and discharging were measured using the above lithium ion secondary battery (2016 coin battery) according to the following measuring method.

The battery was charged at a current density of 0.16 mA/cm$^2$ to 5 mV with respect to the lithium counter electrode, then charged at a constant voltage of 5 mV to a charge capacity value of 350 mAh/g, and after doping lithium into the negative electrode, the battery was discharged at a current density of 0.33 mA/cm$^2$ to 1.5V with respect to the lithium counter electrode. Subsequently, at the 2nd, and 3rd cycle, the battery was charged by a CC-CV mode at the same current density at 10 mV and 0.005 C cut off, and discharged in every cycles at 0.04 C to 1.5V.

The total sum of a difference between the charge capacity and the discharge capacity for the 3 cycles was calculated as an initial irreversible capacity. Further, the discharge capacity in the 3rd cycle was defined as the discharge capacity of the current material, and (the discharge capacity in the 3rd cycle)/(the discharge capacity in the 3rd cycle+the initial irreversible capacity) was defined as the initial efficiency.

<Production Method for Non-Aqueous Electrolyte Secondary Battery (Laminate Battery)>

A positive electrode sheet, a negative electrode sheet, and a polyethylene separator produced according to the above methods were laminated in an order of the negative electrode, the separator, and the positive electrode. A thus obtained battery element was wrapped in a cylindrical aluminum laminate film, and an electrolyte solution having dissolved LiPF$_6$ to 1 mol/L in a mixed solvent of ethylene carbonate (EC), dimethyl carbonate (DMC), and ethyl methyl carbonate (EMC) (volume ratio=3:3:4) was injected therein, followed by vacuum tight sealing to yield a sheet-formed non-aqueous electrolyte secondary battery. Further, the sheet-formed battery was pressed between glass plates to improve closeness between the electrodes.

<Low Temperature Regeneration Property>

A low temperature regeneration property was measured according to the following method using a laminate non-aqueous electrolyte secondary battery produced according to the above production method for a non-aqueous electrolyte secondary battery.

To a non-aqueous electrolyte secondary battery not subjected to a charge and discharge cycle, 3 cycles of initial charge and discharge were performed at 25° C. in a voltage range of 4.1 V to 3.0 V, at a current value of 0.2 C (1 C is defined as a current value, at which a rated capacity based on a discharge capacity at 1 hour rate is discharge in 1 hour; the same shall apply hereinbelow.), and 2 cycles were performed in a voltage range of 4.2 V to 3.0 V, at a current value of 0.2 C (in charging, constant voltage charging at 4.2 V was further performed for 2.5 hours).

A low temperature regeneration property was determined by charging at a current value of 0.2 C up to SOC 50%, then performing constant-current charging for 10 sec in a low temperature environment of −30° C. at each current value of ⅛ C, ¼ C, ½ C, 1.5 C, 2.5 C, 3.5 C, and 5 C, measuring a decrease in the battery voltage 2 sec after charging under each condition, calculating from the measured values a current value I that can flow within 2 sec when the charging upper limit voltage is set at 4.2 V, and defining a value computed by the formulation of 4.2×I(W) as a low temperature regeneration property value of each battery. The low temperature regeneration property was expressed by a ratio of the low temperature regeneration value of each battery with respect to a low temperature regeneration value of Comparative Example 1 described below defined as 100.

The results of measurements on initial efficiency, discharge capacity, peel strength, and low temperature regeneration property are shown in Table 2.

Example 2

A sample was prepared by the same method as in Example 1 and evaluated by the same method as in Example 1, except that the addition amount of carbon black was changed to 2.5 parts by mass with respect to 100 parts by mass of graphite particles. The results are shown in Table 1 and Table 2.

Comparative Example 1

A sample was prepared by the same method as in Example 1 and a similar evaluation was conducted, except that carbon black was not added. The results are shown in Table 1 and Table 2.

Comparative Example 2

To the graphite particles 3 parts by mass of the carbon black with respect to 100 parts by mass of the graphite particles, and the petroleum heavy oil in an amount adjusted such that 3 parts by mass of amorphous carbon equivalent to residual carbon was to be coated on 100 parts by mass of graphite, were added together, and mixed and stirred. The obtained mixture was subjected to a heat treatment in an inert gas at 1100° C., and the heat treated product was crushed and classified to obtain a multilayer structure carbon material, in which carbon black fine particles and amorphous carbon were coated on a surface of graphite particles.

With respect to the sample, a volume-based average particle diameter ($D_{50}$), a tapped density, a BET specific surface area, a Raman R value, a Raman $R_{(90/10)}$ value, and a total pore volume (≤200 nm) were measured or calculated according to the above measurement methods. The results are shown in Table 1.

A sample was prepared by the same method as in Example 1 and a similar evaluation was conducted, except that the multilayer structure carbon material was used. The results of measurements on initial efficiency, discharge capacity, peel strength, and low temperature regeneration property are shown in Table 2.

Example 3

To 100 parts by mass of graphite particles having a volume-based average particle diameter ($D_{50}$) of 23.9 μm, a BET specific surface area (SA) of 4.9 m²/g, and a tapped density of 1.00 g/cm³, 2 parts by mass of carbon black having a primary particle diameter of 40 nm, a BET specific surface area (SA) of 62 m²/g, and a DBP oil absorption amount of 338 mL/100 g was added, and the mixture was stirred by a fiber mixer (MX-X48, produced by Panasonic Corporation) in a high speed mode (rotating speed: approx. 11,000 rpm) for 20 min. The mixed powder and a petroleum heavy oil obtained during thermal cracking of naphtha as a precursor of amorphous carbon were mixed, and subjected to a heat treatment in an inert gas at 1300° C. The heat treated product was crushed and classified to obtain a multilayer structure carbon material, in which carbon black fine particles and amorphous carbon were coated on a surface of graphite particles.

It was confirmed from the yield of the heat treatment that the obtained multilayer structure carbon material was coated with 3 parts by mass of amorphous carbon with respect to 100 parts by mass of graphite.

With respect to the sample, a volume-based average particle diameter ($D_{50}$), a BET specific surface area, a tapped density, a Raman R value, a Raman $R_{(90/10)}$ value, and a total pore volume (≤200 nm) were measured or calculated according to the above measurement methods. The results are shown in Table 1. A low temperature regeneration property was measured by the above measurement method. The result is shown in Table 2. Meanwhile, the low temperature regeneration property was expressed by a ratio of the low temperature regeneration value of a battery with respect to a low temperature regeneration value of Comparative Example 3 described below defined as 100.

Example 4

A sample was prepared by the same method as in Example 3 and a similar evaluation was conducted as in Example 3, except that carbon black with a primary particle diameter of 50 nm, a BET specific surface area (SA) of 50 m²/g, and a DBP oil absorption amount of 175 mL/100 g was used. The results are shown in Table 1 and Table 2.

Example 5

A sample was prepared by the same method as in Example 3 and a similar evaluation was conducted as in Example 3, except that carbon black with a primary particle diameter of 75 nm, a BET specific surface area (SA) of 30 m²/g, and a DBP oil absorption amount of 86 mL/100 g was used. The results are shown in Table 1 and Table 2.

Example 6

A sample was prepared by the same method as in Example 3 and a similar evaluation was conducted as in Example 3, except that carbon black with a primary particle diameter of 24 nm, a BET specific surface area (SA) of 115 m²/g, and a DBP oil absorption amount of 110 mL/100 g was used. The results are shown in Table 1 and Table 2.

Example 7

A sample was prepared by the same method as in Example 3 and a similar evaluation was conducted as in Example 3, except that carbon black with a primary particle diameter of 24 nm, a BET specific surface area (SA) of 110 m²/g, and a DBP oil absorption amount of 78 mL/100 g was used. The results are shown in Table 1 and Table 2.

Comparative Example 3

A sample was prepared by the same method as in Example 3 and a similar evaluation was conducted as in Example 3, except that carbon black was not added. The results are shown in Table 1 and Table 2.

Example 8

To 100 parts by mass of graphite particles having a volume-based average particle diameter ($D_{50}$) of 16.1 μm, a BET specific surface area (SA) of 6.8 m²/g, and a tapped density of 1.02 g/cm³, 2 parts by mass of carbon black having a primary particle diameter of 24 nm, a BET specific surface area (SA) of 115 m²/g, and a DBP oil absorption amount of 110 mL/100 g was added. Without previous stirring, the mixed powder and a petroleum heavy oil obtained during thermal cracking of naphtha as a precursor of amorphous carbon were mixed, and subjected to a heat treatment in an inert gas at 1300° C. The heat treated product was crushed and classified to obtain a multilayer structure carbon material, in which carbon black fine particles and amorphous carbon were coated on a surface of graphite particles.

It was confirmed from the yield of the heat treatment that the obtained multilayer structure carbon material was coated with 3 parts by mass of amorphous carbon with respect to 100 parts by mass of graphite.

With respect to the sample, a volume-based average particle diameter ($D_{50}$), a BET specific surface area, a tapped density, a Raman R value, and a Raman $R_{(90/10)}$ value were measured or calculated according to the above measurement methods. The results are shown in Table 1. A peel strength and a low temperature regeneration property were measured by the above measurement methods. The results are shown in Table 2. Meanwhile, the low temperature regeneration property was expressed by a ratio of the low temperature regeneration value of a battery with respect to a low temperature regeneration value of Comparative Example 4 described below defined as 100.

Example 9

A sample was prepared by the same method as in Example 8 and a similar evaluation was conducted as in Example 8, except that 2 parts by mass of carbon black was added to 100 parts by mass of graphite particles and the mixture was stirred by a rotary mixer having a disintegrating mechanism with a chopper for a carbon black aggregate and a powder mixing mechanism with a rotating shovel at a chopper rotating speed of 3000 rpm for 5 min. The results are shown in Table 1 and Table 2.

Example 10

A sample was prepared by the same method as in Example 8 and a similar evaluation was conducted as in Example 8, except that 2 parts by mass of carbon black was added to 100 parts by mass of graphite particles and the mixture was stirred by a rotary mixer having a disintegrating mechanism with a chopper for a carbon black aggregate and a powder mixing mechanism with a rotating shovel at a chopper rotating speed of 3000 rpm for 20 min.

Comparative Example 4

A sample was prepared by the same method as in Example 8 and a similar evaluation was conducted as in Example 8, except that carbon black was not added. The results are shown in Table 1 and Table 2.

TABLE 1

| | $D_{50}$ (μm) | BET specific surface area (m²/g) | Tapped density (g/cm³) | Raman R value | Raman $R_{(90/10)}$ value | Total pore volume (≤200 nm) (mL/g) |
|---|---|---|---|---|---|---|
| Example 1 | 10.1 | 6.7 | 1.01 | 0.51 | 2.7 | 0.10 |
| Example 2 | 10.1 | 6.4 | 1.02 | 0.48 | 2.0 | 0.09 |
| Comparative Example 1 | 10.7 | 4.3 | 1.05 | 0.32 | 3.3 | 0.03 |
| Comparative Example 2 | 11.2 | 5.0 | 0.94 | 0.47 | 4.4 | 0.03 |
| Example 3 | 24.8 | 2.9 | 1.09 | 0.44 | 3.5 | 0.03 |
| Example 4 | 25.2 | 3.2 | 1.10 | 0.53 | 3.2 | 0.03 |
| Example 5 | 25.5 | 3.3 | 1.11 | 0.52 | 3.1 | 0.04 |
| Example 6 | 25.7 | 3.8 | 1.14 | 0.50 | 2.5 | 0.04 |
| Example 7 | 25.3 | 3.7 | 1.14 | 0.51 | 2.3 | 0.04 |
| Comparative Example 3 | 24.3 | 2.2 | 1.12 | 0.30 | 3.0 | 0.01 |
| Example 8 | 18.1 | 5.2 | 1.10 | 0.50 | 2.0 | — |
| Example 9 | 17.7 | 4.7 | 1.12 | 0.57 | 2.2 | — |
| Example 10 | 17.5 | 4.5 | 1.14 | 0.54 | 2.7 | — |
| Comparative Example 4 | 16.2 | 3.4 | 1.14 | 0.32 | 3.1 | — |

TABLE 2

| | Peel strength (mN/mm) | Low temperature regeneration property (Reference Comparative Example = 100) | Initial efficiency (%) | Discharge capacity (mAh/g) |
|---|---|---|---|---|
| Example 1 | 10.0 | 122 | 89 | 361 |
| Example 2 | 10.0 | 115 | 90 | 363 |
| Comparative Example 1 | 5.5 | 100 | 93 | 363 |
| Comparative Example 2 | 4.0 | 106 | 91 | 361 |
| Example 3 | — | 117 | — | — |
| Example 4 | — | 117 | — | — |
| Example 5 | — | 125 | — | — |
| Example 6 | — | 128 | — | — |
| Example 7 | — | 126 | — | — |
| Comparative Example 3 | — | 100 | — | — |
| Example 8 | 23.0 | 111 | — | — |
| Example 9 | 26.0 | 110 | — | — |
| Example 10 | 26.0 | 108 | — | — |
| Comparative Example 4 | 17.0 | 100 | — | — |

As obvious from Table 2, a carbon material according to the present invention is superior in peel strength when used in a negative electrode, and a low temperature regeneration property is remarkably improved when utilized as a negative electrode active material for a lithium ion secondary battery.

While the invention has been described in detail and with reference to specific embodiments thereof, it will be apparent to one skilled in the art that various changes and modifications can be made therein without departing from the spirit and scope thereof.

INDUSTRIAL APPLICABILITY

By using a carbon material according to the present invention, a non-aqueous electrolyte secondary battery superior in input-output characteristics even at a low temperature can be realized, and therefore the same can be utilized favorably in the field of an automotive secondary battery, which requires large scale and high input-output characteristics and is used even at a low temperature.

The invention claimed is:

1. A carbon material for a non-aqueous electrolyte secondary battery comprising:
    hybrid particles comprising graphite particles and carbon fine particles;
    wherein
    the carbon fine particles are uniformly present on the surface of the graphite particles and wherein a content of the carbon fine particles is 0.01 parts by mass to 20 parts by mass with respect to 100 parts by mass of the graphite particles,
    a primary particle size of the carbon fine particles is from 3 nm to 500 nm, and
    wherein a ratio of microscopic Raman R values measured for 30 hybrid particles selected at random by a microscopic Raman spectroscopy apparatus give a Raman $R_{(90/10)}$) value expressed by the following formula 2 of from 1 to 4.3;

Raman $R_{(90/10)}$ value=(Microscopic Raman $R$ value of the particle whose microscopic Raman $R$ value is the (total number of measured particles×0.9)th smallest microscopic Raman $R$ value in the case where the microscopic Raman $R$ values are arranged in an ascending order)/ (Microscopic Raman $R$ value of the particle whose microscopic Raman $R$ value is the (total number of measured particles×0.1)th smallest microscopic Raman $R$ value in the case where the microscopic Raman $R$ values are arranged in an ascending order). Formula 2:

2. The carbon material for a non-aqueous electrolyte secondary battery according to claim 1, wherein the hybrid particles further comprise amorphous carbon.

3. The carbon material for a non-aqueous electrolyte secondary battery according to claim 1, wherein the Raman R value of the hybrid particles is from 0.35 to 1.

4. The carbon material for a non-aqueous electrolyte secondary battery according to claim 1, wherein a BET specific surface area of the hybrid particles is 4.5 $m^2/g$ or more.

5. The carbon material for a non-aqueous electrolyte secondary battery according to claim 1, wherein the carbon material has a total pore volume of pores having a pore size of not larger than 200 nm as determined by a Hg porosimetry analysis of 0.04 mL/g or more.

6. A negative electrode for a non-aqueous electrolyte secondary battery comprising:
    a current collector having a negative electrode active material on the current collector, wherein the negative electrode active material is the carbon material for a non-aqueous electrolyte secondary battery according to claim 1.

7. A non-aqueous electrolyte secondary battery comprising a positive electrode and a negative electrode, which are able to absorb and release a metal ion, and an electrolyte solution, wherein the negative electrode is the negative electrode for a nor aqueous electrolyte secondary battery according to claim 6.

8. A production method for a carbon material for a non-aqueous electrolyte secondary battery, according to claim 2,
    the process comprising:
    coating the carbon tine particles on to the graphite particles in a dry state, and
    mixing the graphite particles coated with the carbon fine particles with an organic precursor of an amorphous carbon to obtain a mixture, and then
    subjecting the mixture to a firing treatment.

9. The production method for a carbon material for a non-aqueous electrolyte secondary battery according to claim 8, wherein an amount of oil absorption of the carbon tine particles is 330 mL/100 g or less.

10. The carbon material for a non-aqueous electrolyte secondary battery according to claim 1, wherein the Raman R value of the hybrid particles is 0.8 or less.

* * * * *